(12) United States Patent
Dehlinger et al.

(10) Patent No.: US 7,181,451 B2
(45) Date of Patent: *Feb. 20, 2007

(54) PROCESSING INPUT TEXT TO GENERATE THE SELECTIVITY VALUE OF A WORD OR WORD GROUP IN A LIBRARY OF TEXTS IN A FIELD IS RELATED TO THE FREQUENCY OF OCCURRENCE OF THAT WORD OR WORD GROUP IN LIBRARY

(75) Inventors: Peter J. Dehlinger, Palo Alto, CA (US); Shao Chin, Stanford, CA (US)

(73) Assignee: Word Data Corp., Palo Alto, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 10/261,971

(22) Filed: Sep. 30, 2002

(65) Prior Publication Data

US 2004/0006558 A1 Jan. 8, 2004

Related U.S. Application Data

(63) Continuation of application No. PCT/US02/21200, filed on Jul. 3, 2002, and a continuation of application No. PCT/US02/21198, filed on Jul. 3, 2002.

(60) Provisional application No. 60/394,204, filed on Jul. 5, 2002.

(51) Int. Cl.
*G06F 17/30* (2006.01)
*G06F 7/00* (2006.01)
*G06F 17/28* (2006.01)
*G06F 17/00* (2006.01)

(52) U.S. Cl. .............................. 707/6; 707/1; 707/200; 704/4; 704/9; 715/531; 715/534

(58) Field of Classification Search ................ 707/3–7, 707/100–104.1, 1–2; 704/2–9, 218–220; 715/530–536, 515
See application file for complete search history.

(56) References Cited

U.S. PATENT DOCUMENTS 4,554,631 A 11/1985 Reddington (Continued)

FOREIGN PATENT DOCUMENTS

EP 0266001 * 5/1988 ................. 15/20

(Continued)

OTHER PUBLICATIONS

Tomek S et al. "Natural language information retrieval in digital libraries", ACM 1996, pp. 117-125.*

(Continued)

*Primary Examiner*—Srirama Channavajjala
(74) *Attorney, Agent, or Firm*—Perkins Coie LLP

(57) ABSTRACT

Disclosed is an automated system, machine-readable storage medium embodying computer-executable code, and method for generating descriptive words and optionally, multi-word groups derived from a digitally encoded, natural-language input text that describes a concept, invention, or event in a selected field. The system includes (a) an electronic digital computer, (b) a database of words and optionally, word-groups derived from a plurality of texts, and (c) machine-readable storage medium embodying computer-executable code for accessing the database. The database provides, or can be used to calculate, a selectivity value for each of the words and optionally, word groups contained in or derived from the input text. Words and optionally, word groups having an above-threshold selectivity value are selected as descriptive terms from the input text.

7 Claims, 16 Drawing Sheets

U.S. PATENT DOCUMENTS

| | | | |
|---|---|---|---|
| 5,297,039 | A | 3/1994 | Kanaegami et al. |
| 5,694,592 | A * | 12/1997 | Driscoll .................... 707/3 |
| 5,745,889 | A | 4/1998 | Burrows |
| 5,745,890 | A | 4/1998 | Burrows |
| 5,752,051 | A * | 5/1998 | Cohen ..................... 704/1 |
| 5,794,177 | A * | 8/1998 | Carus et al. ............... 704/9 |
| 5,867,811 | A | 2/1999 | O'Donoghue |
| 5,873,056 | A * | 2/1999 | Liddy et al. ............... 704/9 |
| 5,893,102 | A * | 4/1999 | Maimone et al. ......... 707/101 |
| 5,915,249 | A * | 6/1999 | Spencer .................... 707/5 |
| 5,937,422 | A * | 8/1999 | Nelson et al. ............. 715/531 |
| 5,940,624 | A * | 8/1999 | Kadashevich et al. ...... 704/9 |
| 5,983,171 | A * | 11/1999 | Yokoyama et al. ......... 704/10 |
| 6,006,221 | A * | 12/1999 | Liddy et al. ............... 707/5 |
| 6,006,223 | A * | 12/1999 | Agrawal et al. ............ 707/5 |
| 6,009,397 | A | 12/1999 | Siegel |
| 6,081,774 | A * | 6/2000 | de Hita et al. ............. 704/9 |
| 6,088,692 | A * | 7/2000 | Driscoll .................... 707/5 |
| 6,138,116 | A * | 10/2000 | Kitagawa et al. .......... 707/5 |
| 6,216,102 | B1 * | 4/2001 | Martino et al. ............ 704/9 |
| 6,275,801 | B1 | 8/2001 | Novak et al. |
| 6,279,017 | B1 * | 8/2001 | Walker ..................... 715/529 |
| 6,374,210 | B1 * | 4/2002 | Chu ......................... 704/9 |
| 6,393,389 | B1 * | 5/2002 | Chanod et al. ............. 704/7 |
| 6,405,161 | B1 * | 6/2002 | Goldsmith ................. 704/9 |
| 6,415,250 | B1 * | 7/2002 | van den Akker ........... 704/9 |
| 6,529,902 | B1 * | 3/2003 | Kanevsky et al. .......... 707/5 |
| 6,633,868 | B1 * | 10/2003 | Min et al. .................. 707/3 |
| 6,665,668 | B1 * | 12/2003 | Sugaya et al. .............. 707/6 |
| 6,669,091 | B2 * | 12/2003 | Sharpe et al. .......... 235/462.12 |
| 6,687,689 | B1 * | 2/2004 | Fung et al. ................. 707/3 |
| 6,704,694 | B1 * | 3/2004 | Basdogan et al. ........... 703/4 |
| 7,003,516 | B2 * | 2/2006 | Dehlinger et al. .......... 707/5 |
| 7,016,895 | B2 * | 3/2006 | Dehlinger et al. .......... 707/5 |
| 7,024,408 | B2 * | 4/2006 | Dehlinger et al. .......... 707/5 |
| 2002/0022974 | A1 | 2/2002 | Lindh |
| 2002/0052901 | A1 | 5/2002 | Guo et al. |
| 2003/0026459 | A1 | 2/2003 | Won et al. |
| 2003/0028566 | A1 | 2/2003 | Nakano |
| 2003/0177000 | A1 * | 9/2003 | Mao et al. ................. 704/9 |
| 2003/0235807 | A1 * | 12/2003 | Paley ........................ 434/178 |
| 2004/0006459 | A1 * | 1/2004 | Dehlinger et al. .......... 704/10 |
| 2004/0015481 | A1 | 1/2004 | Zinda |
| 2004/0024733 | A1 | 2/2004 | Won et al. |
| 2004/0054520 | A1 * | 3/2004 | Dehlinger et al. .......... 704/5 |
| 2004/0059565 | A1 * | 3/2004 | Dehlinger et al. .......... 704/5 |
| 2004/0111388 | A1 | 6/2004 | Boiscuvier et al. |
| 2004/0186833 | A1 | 9/2004 | Watts |
| 2004/0230568 | A1 | 11/2004 | Budzyn |

FOREIGN PATENT DOCUMENTS

| | | | | |
|---|---|---|---|---|
| EP | 0524385 | A2 * | 2/1993 | ............ 15/20 |
| EP | 0597630 | A1 * | 11/1993 | ............ 15/403 |
| EP | 0813158 | A2 * | 12/1997 | ............ 17/30 |
| EP | 1011056 | A1 * | 6/2000 | ............ 17/30 |
| EP | 1 049 030 | A1 | 11/2000 | |
| EP | 1 168 202 | A2 | 1/2002 | |
| GB | 2264186 | A1 | 8/1993 | |
| WO | WO 99/10819 | | 3/1999 | |
| WO | WO 98/62001 | * | 12/1999 | ............ 17/27 |
| WO | WO 00/41062 | * | 7/2000 | ............ 3/23 |
| WO | WO 03/058492 | * | 7/2003 | ............ 17/28 |
| WO | WO 03/079231 | A1 | 9/2003 | |

OTHER PUBLICATIONS

James Bret M et al. "Natural-language processing support for developing policy-governed software systems", 39th Int. conf. on Techn. for object-oriented lang. and syst.IEEE computer society press, jly 2001, pp. 263-274.*

Dekang Lin et al. "induction of semantic classes from natural language text", KDD, ACM 2001, 6 pages.*

George Berg, "a connectionist parser with recursive sentence structure and Lexical disambiguation", proceedings tenth nationa conference on artifical intellegence-AAA1-92, 1992, 6 pages.*

Moon,N et al. "Experiments in text-based mining and analysis of biological information from MEDLINE on functionally-related genes",proceedings of the 18th international conference on systems engiineering, IEEE 2005.*

Shileakov,D.V et al. "On zonal morphological approach to atural language texts processing",proceedings, DCC 2000, data compression conferences, 2000, one page.*

Chutatape,O et al. "automatic license number extraction and its parallel implementation", 25 annual conference on Industrial electronics socienty, 1999, vol. 2, pp. 704-709.*

Turksen,I.B "computing with descriptive and veristic words", 18th international conference of the Fuzzy information, processing socieity, 1999, pp. 13-17.*

Niwa, Y. et al., "Patent Search: A Case Study of Cross-DB Associative Search", Proc. Of the Third NTCIR Workshop, 2003 Natl. Inst. of Informatics, 7 pages.

Larkey, L., "A Patent Search and Classification System", Proc. Of DL-99, 4th AC, Conference on Digital Libraries, 1999, 9 pages.

Cohen, W., "Text Categorization and Relational Learning", Proc. of 12th Intl. Conference (ML95) on Machine Learning, 1995, 9 pages.

Krahmer, E. and Theune, M., "Context Sensitive Generation of Descriptions", 1998, 4 pages.

Meyer, H. et al., "The Xircus Search Engine", Univ. of Rostock, Database Research Group, 2003, 6 pages.

Ford, G. et al., "Patern matching techniques for correcting low confidence OCR words in a known context", Natl. Library of Medicine, Bethesda, Maryland 20894, 9 pages.

* cited by examiner

PROCESSING INPUT TEXT TO GENERATE THE SELECTIVITY VALUE OF A WORD OR WORD GROUP IN A LIBRARY OF TEXTS IN A FIELD IS RELATED TO THE FREQUENCY OF OCCURRENCE OF THAT WORD OR WORD GROUP IN LIBRARY

This application claims the benefit of priority to U.S. Provisional Patent Application Ser. No. 60/394,204 filed on Jul. 5, 2002, the present application is also a continuation of PCT Patent Application No. PCT/US02/21198 filed on Jul. 3, 2002, and the present application is a continuation of PCT Patent Application No. PCT/US02/21200 filed on Jul. 3, 2002, all of which are incorporated in their entirety herein by reference.

FIELD OF THE INVENTION

This invention relates to the field of text processing, and in particular, to a method, machine-readable storage medium embodying computer-executable code, and system for generating descriptive words, and optionally, descriptive word groups, e.g., word pairs, from a natural-language text.

BACKGROUND OF THE INVENTION

One of the major challenges in managing information is to locate natural-language texts describing a particular idea, invention or vent. For example, one might wish to locate texts that concern a set of events relating to a legal proposition, or a set of facts relating to a business situation, or a description of a particular invention or idea or concept.

There are a number of systems available commercially for accessing digitally process texts. Typically, in finding a desired text, one first classifies the text into some field or class that the text is likely to be found in. For example, in the legal field, one might confine the text search to an appellate cases relating to a specific area of the law or in a specific jurisdiction. In a technical or patent search, one might confine the search to a particular area of technology of patent class or subclass. This initial classification serves the purpose of narrowing the search to the areas of interest or most likely text matches.

Once a class or area of search has been identified, a search for a matching text is typically carried out by Boolean word search methods. In this approach, the user provides key words, and/or groups of words, typically specified by a Boolean connection, and a search algorithm is used to identify digitally processed texts that contain that word or groups of words. This approach, although widely available, is nonetheless limited in two fundamental respects. First, the search can be fairly time consuming, since with each new Boolean search command, a search output must be evaluated, to refine and improve the search results. Often this means reading through portions of the texts retrieved, then deciding how the search command can be improved to sharpen the search results. Secondly, the approach is subject to the general problem of false maxima. That is, even though a retrieved text has many of the key words included in the search commands, it is impossible to know whether a text with a maximum word overlap with the search words, unless only a small number of search words are used.

At the other extreme, efforts in the field of natural-language processing are aimed at "reading" an input text for content, and trying to match the target text with a library of digitally processed in content, rather than on the basis of words alone. At present, this field is still at an embryonic stage, and impractically slow, since every text that is searched must be individually processed for content.

It would therefore be desirable to provide a text processing and matching system that is substantially automated, that is, does not require user input to classify the field of search and/or identify key words and words phrases useful for text searching.

It would be further desirable to provided such a system that overcomes the problem of false minima associated with Boolean word searching, and is capable of conducting complex text search in real time, e.g., in a matter of seconds or a few minutes.

SUMMARY OF THE INVENTION

In one aspect, the invention includes a machine-readable storage medium embodying computer-executable code that is operable, when used to control an electronic computer, to identify descriptive words contained in a digitally encoded input text. The code operates to (i) process the input text to generate a list of text words, (ii) select a text word from (i) as a descriptive word if that word has an above-threshold selectivity value in at least one library of texts in a field, and (iii) store or display the words selected in (ii) as descriptive words.

The selectivity value of a word in a library of texts in a field is related to the frequency of occurrence of that word in the library in the field, relative to the frequency of occurrence of the same word in one or more other libraries of texts in one or more other fields, respectively. The threshold selectivity value for a word, in at least one library, is preferably at least 1.25, typically 2 or more.

The code may be operable, in the processing step, to classify words into generic words, which may be removed from the text, words having a verb root, which may be assigned a common verb-root form, and remaining words, representing primarily non-generic nouns and adjectives.

The code may be operable, in carrying out the selecting step, of (i) accessing a database containing (a) words from the library texts, and (b) for each database word, a selectivity value associated with that word, and (ii) recording from the database, the selectivity value for that word.

The selectivity value associated with a word in the database may include the selectivity values determined for each of a plurality of libraries of texts, typically $N \geq 2$ libraries, or the greatest selectivity value determined with respect to each of the libraries, or the selectivity value associated with a selected library. Alternatively, the selectivity value associated with a word in the database may be assigned one of a plurality of values, each value encompassing a range of calculated selectivity values of a word. In still another embodiment, an above-threshold selectivity value for a word in said database may be implicit, and indicated simply by the presence of that word in the database.

The code may be further operable to identify descriptive word groups formed of proximately arranged words in the input text. In this embodiment, the processing step further includes (i) constructing from non-generic words in the input text, a plurality of proximately arranged word groups, and the selecting step further includes (ii) selecting each word group from (i) as a descriptive word group if that word group has an above-threshold selectivity value. The selectivity value of a word group in a library of texts in a field is related to the frequency of occurrence of that word group in the library in a field, relative to the frequency of occurrence of the same word group in one or more other libraries of texts in one or more other fields, respectively.

In the latter embodiment, the database may include, for each word, text and library identifiers, and text-specific word identifiers. The code in this embodiment may be operable in carrying out the step of selecting a word group with an above-threshold selectivity value of (i) accessing the database to identify texts and text-specific identifiers associated with that word pair, and (ii) from the identified texts and text-specific identifiers recorded in step (i), determining the selectivity value of that word group.

In another aspect, the invention includes an automated system for generating descriptive words contained in a digitally encoded input text. The system includes (a) a computer, (b) a database accessible by the computer, and (c) the above machine-readable storage medium embodying computer-executable code. The database provides a plurality of words and associated selectivity values, where the selectivity value associated with a word is related to the frequency of occurrence of that word in at least one library of texts in a field, relative to the frequency of occurrence of the same word in one or more libraries of texts in one or more other fields, respectively. The code is operable, in carrying out said selecting step, of (i) accessing the database and (ii) recording from the database, the selectivity value associated with that word.

In another aspect, the invention includes an automated method for generating descriptive terms contained in a digitally encoded input text by the steps performed by the above machine-readable storage medium embodying computer-executable code, when used to control the operation of an electronic computer.

These and other objects and features of the invention will become more fully apparent when the following detailed description of the invention is read in conjunction with the accompanying drawings.

DETAILED DESCRIPTION OF THE INVENTION

A. Definitions

Figure 1:
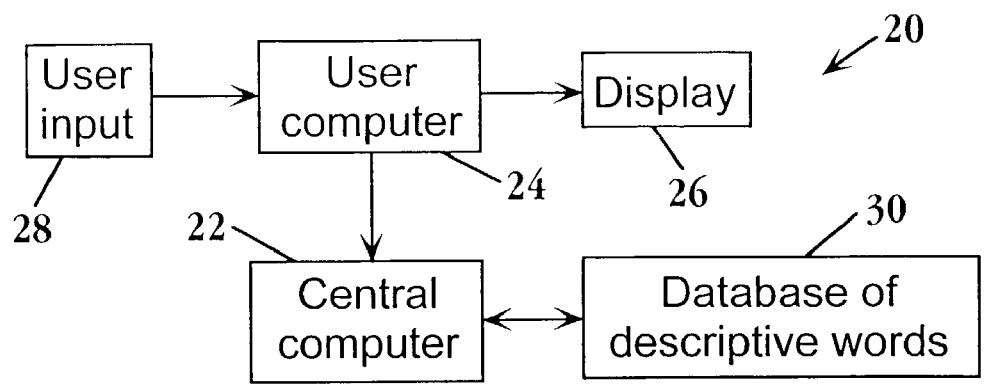
FIG. 1 illustrates components of the a system for processing and searching texts in accordance with the invention.

"Natural-language text" refers to text expressed in a syntactic form that is subject to natural-language rules, e.g., normal English-language rules of sentence construction. Examples include descriptive sentences, groups of descriptive sentences making up paragraphs, such as summaries and abstracts, single-sentence texts, such as patent claims, and full texts composed of multiple paragraphs.

A "verb-root" word is a word or phrase that has a verb root. Thus, the word "light" or "lights" (the noun), "light" (the adjective), "lightly" (the adverb) and various forms of "light" (the verb), such as light, lighted, lighting, lit, lights, to light, has been lighted, etc., are all verb-root words with the same verb root form "light," where the verb root form selected is typically the present-tense singular (infinitive) form of the verb "Verb form" refers to the form of a verb, including present and past tense, singular and plural, present and past participle, gerund, and infinitive forms of a verb. "Verb phrase" refers to a combination of a verb with one or more auxiliary verbs including (i) to, for, (ii) shall, will, would, should, could, can, and may, might, must, (iii) have has, had, and (iv) is are, was and were. Verb-root words expressed in a common verb form means that the words have the same form, e.g., present tense, singular form.

"Target concept, invention, or event" refers to an idea, invention, or event that is the subject matter to be searched in accordance with the invention. A target concept, invention, or concept may be expressed as a list of descriptive words and optionally, word groups, such as word pairs, as phrases or as natural-language text, e.g., composed of one or more sentences.

"Target input text" or "input text" refers to a target concept, invention, or event that is expressed in natural-language text, typically containing at least one, usually two or more complete sentences. Text summaries, abstracts and patent claims are examples of target input texts.

"Abstract" refers to a summary form, typically composed of multiple sentences, of an idea, concept, invention, discovery or the like. Examples, include abstracts from patents and published patent applications, journal article abstracts, and meeting presentation abstracts, such as poster-presentation abstracts, and case notes form case-law reports.

"Claim" refers to a claim in a patent application or issued patent.

"Full text" refers to the full text of an article, patent, case-law report, business article, and the like.

"Field" refers to a given technical, scientific, legal or business field, as defined, for example, by a specified technical field, or a patent classification, including a group of patent classes (superclass), classes, or sub-classes, or a legal field or speciality, such "torts" or "negligence" or "property rights".

"Generic words" refers to words in a natural-language text that are not descriptive of, or only non-specifically descriptive of, the subject matter of the text. Examples include prepositions, conjunctions, pronouns, as well as certain nouns, verbs, adverbs, and adjectives that occur frequently in texts from many different fields. The inclusion of a word in a database of generic words, e.g., in a look-up table of generic words, is somewhat arbitrary, and can vary with the type of text analysis being performed, and the field of search being conducted, as will be appreciated below. Typically generic words have a selectivity value in any group of related libraries, e.g., libraries of different patent classes or superclasses, (see below) less than about 1.25.

"Non-generic words" are those words in a text remaining after generic words are removed. The following text, where generic words are enclosed by brackets, and non-generic words, left unbracketed, will illustrate:

[A method and apparatus for] treating psoriasis [includes a] source [of] incoherent electromagnetic energy. [The] energy [is] directed [to a region of] tissue [to be] treated. [The] pulse duration [and the] number [of] pulses [may be] selected [to] control treatment parameters [such as the] heating [of] healthy tissue [and the] penetration depth [of the] energy [to] optimize [the] treatment. [Also, the] radiation [may be] filtered [to] control [the] radiation spectrum [and] penetration depth.

A "sentence" is a structurally independent grammatical unit in a natural-language written text, typically beginning with a capital letter and ending with a period. In the example above, the first sentence of the text is: "A method and apparatus for treating psoriasis includes a source of incoherent electromagnetic energy." A sentence in a patent claim may include, separately, the claim preamble and individual elements of the claim.

"Distilled text" means text, e.g., a sentences or phrases, from which generic words have been removed. In the example above, the first sentence, reduced to a distilled sentence, reads: "treating psoriasis source incoherent electromagnetic energy."

A "word string" is a sequence of words in a distilled sentence. The word string may be a distilled sentence or phrases or a subset thereof, when the distilled sentence is parsed into two or more separate word strings.

A "word group" is a group, typically a pair, of non-generic words that are proximately arranged in a natural-language text. Typically, words in a word group are non-generic words in the same sentence. More typically they are nearest or next-nearest non-generic word neighbors in a string of non-generic words, e.g., a word string. As an example, the above distilled sentence and word string "treating psoriasis source incoherent electromagnetic energy" would generate the word pairs "treating psoriasis," treating source," "psoriasis source," "psoriasis incoherent," source incoherent," source electromagnetic," and so forth until all combination of nearest neighbors and next-nearest neighbors are considered.

Words and optionally, words groups, usually encompassing non-generic words and word pairs generated from proximately arranged non-generic words, are also referred to herein as "terms".

"Digitally-encoded text" refers to a natural-language text that is stored and accessible in computer-readable form, e.g., computer-readable abstracts or patent claims or other text stored in a database of abstracts, full texts or the like.

"Processed text" refers to computer readable, text-related data resulting from the processing of a digitally-encoded text to generate one or more of (i) non-generic words, (ii) word pairs formed of proximately arranged non-generic words, (iii) sentence and word-number identifiers.

"Library of texts in a field" refers to a library of texts (digitally encoded or processed) that have been preselected or flagged or otherwise identified to indicate that the texts in that library relate to a specific field or area of specialty, e.g., a patent class, patent subclass, or patent superclass. For example, a library may include patent abstracts from each of up to several related patent classes, from one patent class only, or from individual subclasses only. A library of texts typically contains at least 100 texts, and may contain up to 1 million or more.

"Collection of texts" refers to a collection of several different libraries of texts.

"Frequency of occurrence of a term (word or word group) in a library" is related to the numerical frequency of the term in the library of texts, usually determined from the number of texts in the library containing that term, per total number of texts in the library or per given number of texts in a library. Other measures of frequency of occurrence, such as total number of occurrences of a term in the texts in a library per total number of texts in the library, are also contemplated.

The "selectivity value" of a term (word or word group) in a library of texts in a field is related to the frequency of occurrence of that term in that library, relative to the frequency of occurrence of the same term in one or more other libraries of texts in one or more other fields, respectively. The measure of frequency of occurrence of a term is preferably the same for all libraries, e.g., the number of texts in a library containing that term. The selectivity value of a given term for a given field is typically determined as the ratio of the percentage texts in that field that contain that term, to the percentage texts in one or more unrelated field that contain the same term. A selectivity value so measured may be as low as 0.1 or less, or as high as 1,000 or greater. The selectivity value of a word in a library in a field indicates the "field specificity" or "degree of descriptiveness" of that word in that field.

Typically a separate selectivity value is calculated for each of a plurality of $N \geq 2$ selected fields, e.g., given technical fields, with respect to one or more other fields, i.e., fields outside the given technical field. The selectivity value then assigned to a term is the highest selected value calculated for each of the N different fields, or the selectivity value calculated for each different library, or one or more libraries of interest, or the average selectivity value calculated for some subset of selectivity values, e.g., for all libraries in some defined set of libraries.

In calculating the selectivity values of word groups, the word groups in the texts in each of the selected-field libraries and in the libraries of one or more other fields represent word groups generated from proximately arranged non-generic words in digitally encoded texts in the selected and other fields, respectively.

A "selectivity value associated" with a term, e.g., word, in a database may be a selectivity value(s) calculated with respect to a selected library of texts, the highest selectivity value determined for each of a plurality of different library of texts, a mathematical function of a selectivity value, or a simplified range of selectivity values, e.g., a "+" for all terms having a selectivity value above a given threshold, and "−"

for those terms whose selectivity value is at or below this threshold value, or a plurality of selectivity-value ranges, such as 0, +1, +2, +3, and +4 to indicate a range of selectivity values, such as 0 to 1, >1–3, >3–7, >7–15, and >15, respectively. The associated selectivity value may be implicit, where the only terms, e.g., words, in a database are those having an above-threshold selectivity value.

A "match value" of a term is a value corresponding to some mathematical function of the selectivity value of that term, such as a fractional exponential function. For example, the match value of a given term having a selectivity value of X might be $X^{1/2}$ or $X^{1/3}$.

A "text identifier" or "TID" identifies a particular digitally encoded or processed text in a database refers by a patent number, bibliographic citation or other citation information.

A "library identifier" or "LID" identifies the field, e.g., technical field or patent classification of the library containing a given text.

A "classification identifier" of "CID" identifies a particular class, e.g., class or subclass, in an established classification system, to which a particular text in a text library may belong. Where a text library is defined as texts having a particular CID, the CID and LID will be identical. Typically a library will consist of several classes of texts; that is a plurality of different CIDs will be associated with a given LID.

A "sentence identifier" or "SID" identifies the sentence number within a text containing a given word or word group.

A "word identifier" or "WID" identifiers the word number, preferably determined from distilled text, within a text or preferably, within the sentence of a text.

A "verb identifier" or VID identifies whether a given word is a verb-root word.

A "database" refers to a file or a relational database containing different columns or fields of related information, such as text identifiers, corresponding library identifiers (and class identifiers, if different) and corresponding text-specific information, such as sentence identifiers and corresponding word-number identifiers. The data in the database may be arranged in a single table, typically functioning as a computer-accessible file, or may be arranged in two or more tables having different arrangements of data columns that allow for rapid information access of information related to any of a number of different data fields, such as text and text-specific identifiers, or text identifiers and related texts.

A non-generic term (word or word pair) is a "descriptive term" if that term has a selectivity value in at least one library of texts of greater than some threshold value, preferably 1.25–5, e.g., 1.5, 2, or 2.5.

A "list" of terms, such as words or word groups, refers to a plurality of such terms generated and stored in a manner that allows for computer reading and processing of the terms.

B. System and Method Overview

FIG. 1 shows the basic elements of a text-processing and text-matching system 20 in accordance with the present invention. A cental computer or processor 22 receives user input and user-processed information from a user computer 24. The user computer has a user-input-device, such as a keyboard, modem, and/or disc reader 28 by which the user can enter input text or text words describing an idea, concept, or event to be searched, or the input text from which descriptive words and optionally, word pairs are to be identified. A display or monitor 26 displays word, word pair, and/or search information to the user. A descriptive word database 30 in the system is accessible by the central computer in carrying out several of the operations of the system, as will be described.

In a typical system, the user computer is one of several remote access stations, each of which is operably connected to the central computer, e.g., as part of an internet or intranet system in which multiple users communicate with the central computer. Alternatively, the system may include only one user/central computer, that is, where the operations described for the two separate computers are carried out on a single computer.

Where the system includes separate user computer(s) communicating with a central computer, certain operations relating to text processing are, or can be, carried out on a user computer, and certain operations related to text searching and matching are, or can be, carried out on the central computer, through its interaction with one or more target attribute dictionaries. This allows the user to input a target text, have the text processed in a format suitable for text searching at the user terminal, and have the search itself conducted by the central computer. The central computer is, in this scheme, never exposed to the actual target text. Once a text search is completed, the results are reported to the user at the user-computer display. A program or code module, in the form of a well known machine-readable storage medium embodying computer-executable code, as described herein, may be carried out solely by a user computer, solely by the central computer, or jointly by both.

Figure 2:
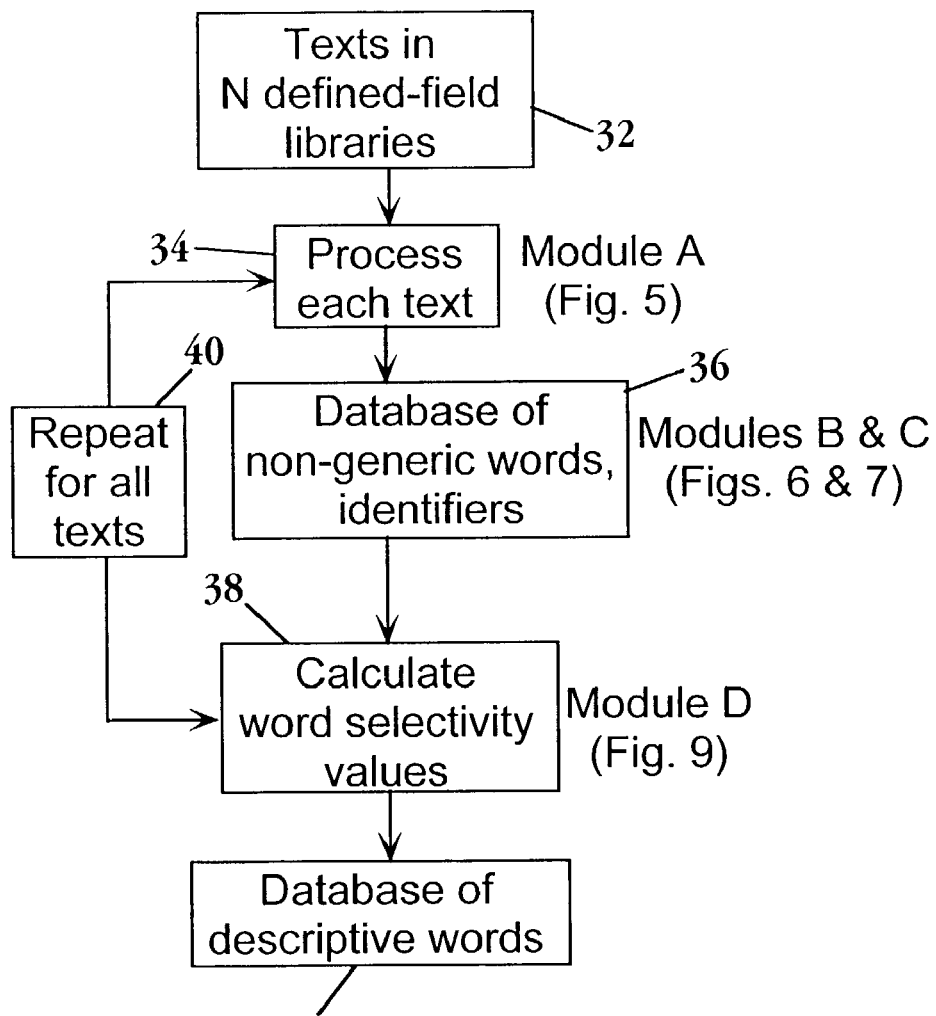
FIG. 2 shows in an overview, flow diagram form, the processing of libraries of texts to form a descriptive word database.

Generating a descriptive word database. FIG. 2 illustrates, in overview, the steps in processing a plurality of texts in $N \geq 2$ defined-field libraries, such as libraries 32, of digitally encoded texts, to form descriptive word database 30. Each of the N libraries contains a plurality of digitally encoded texts in a particular field or speciality that can be defined in one of a variety of ways, e.g., patent classes, subclasses or superclasses, different areas of fields of technology, or different areas of fields or legal or business activity. For example, the libraries may include patent abstracts from all patent classes related to surgical devices (one library), drugs and drug delivery (another library), electronic devices (a third library), and so on, where the categorization of the texts in the libraries is such that several distinct fields or areas of speciality are represented, allowing for the determination of meaningful selectivity values for terms from the texts, as will be described below.

As noted above, each library is a collection of digitally encoded texts, e.g., abstracts, summaries, and/or patent claims, along with pertinent identifying information, e.g., (i) pertinent patent information such as patent number, patent-office classification, inventor names, and patent filing and issues dates, (ii) pertinent journal-reference information, such as source, dates, and author, or (iii) pertinent law-reporter information, such as reporter name, dates, and appellate court. These text identifiers are also referred to herein as TIDs.

Large collections of digitally processed texts used in forming the N libraries may be obtained in tape or CD ROM form, available from a variety of sources, such as the US Patent and Trademark Office, the European Patent Office PO, Dialog Search Service, legal reporter services, and other database sources whose database offerings are readily identifiable from their internet sites. In many of the examples described herein, the texts forming the libraries are from U.S. Patent Bibliographic databases which contain, for all patents issued between 1976 and 2000, various patent identifier information and corresponding patent abstracts. These databases are available in tape form from the USPTO.

With continuing reference to FIG. 2, the texts in the N libraries are processed by a Module A, shown at 34, and described below with reference to FIG. 5. Briefly, Module A operates first to parse a text by punctuation and optionally, certain transition words, such as certain prepositions. The words in the text are then classified into one of three categories: (i) non-generic words, (ii) verb or verb-root words, and (iii) remaining words that tend to include predominantly nouns and adjectival words. The text remaining after removal of generic words (consisting of distilled sentences) may be parsed into word strings typically 2–8 words long, where each distilled sentence may give rise one or more word strings. The module uses a moving window algorithm to generate proximately arranged word pairs in each of the word strings. Thus, the module processes a text into a list of non-generic words and word groups, e.g., proximately arranged word pairs.

The text processor also operates to assign text-specific identifiers, including sentence identifiers or SIDs identifying each sentence, e.g., distilled sentence, within a text, and word identifiers or WIDs, identifying each successive word, e.g., non-generic word, within a sentence or within the text as a whole (if SIDs are not assigned). The processor may also operate to assign word-specific identifiers, such as verb identifiers or VIDs indicating whether a given word in a text is classed as a verb-root word. The "processed text" resulting from a processing of a digitally encoded text thus includes (i) a list of non-generic words, and (ii) text, library, text-specific, and word-specific identifiers associated with each word. Non-generic words contained in each processed text, and the associated identifiers are added to and stored in a database, typically a file, 36 of non-generic words. The words in the database may be arranged alphabetically for rapid searching.

The database of non-generic words just described is used to generate, for each word in the database, a selectivity value that is related to the frequency of occurrence of that word in a library of texts in a selected field, relative to the frequency of occurrence of the same word in one or more other libraries of texts in one or more other fields. Typically a separate selectivity value is calculated for each of a plurality of $N \geq 2$ selected fields, e.g., given technical fields, with respect to one or more other fields, e.g., outside the selected or given technical field. The selectivity value is determined according to the algorithm of Module D, described with respect to FIG. 9.

In one general embodiment, the selectivity value is determined as the frequency of occurrence of that term (word or word pair), measured as the total number of texts containing that term, per total number of texts in that library to the frequency of occurrence of the same term in one or more other defined-field libraries. Thus for example, assume that the term "electromagnetic" is found in 1,500 of 50,000 texts in one defined-field library, and in 500 of 150,000 texts in three libraries representing three other defined fields, where each library contains 50,000 texts. The selectivity value of the word, determined from the ratio of the frequency of occurrence of the term in the one library and the other libraries is therefore 15/500:5/1500, or 9.

It will be appreciated that by selecting a sufficiently large number of texts from each library, a statistically meaningful frequency of occurrence of any word from the library texts is obtained. In a preferred embodiment, the selectivity value of a given word is calculated with respect to each of N different fields, and the selectivity value that is assigned to that word, or associated with that database word, is the highest of the N selectivity values calculated. For example, if selectivity values for the word "electromagnetic" of 9, 3, 4.5, 0.3 and 0.7 are calculated for five different defined-field libraries, the selectivity value assigned that word would be 9.

To produce the database of descriptive words, a selectivity value is associated with each word in database 36 of non-generic words. The selectivity value associated with a word may be the calculated selectivity value itself, e.g., the highest selectivity value among N libraries, or the selectivity values calculated for each of the N different libraries, a value determined from some mathematical function of this selectivity value, e.g., the square root or cube root of the selectivity value, or some simplified value, e.g., one of several ranges of selectivity values, e.g., 0.1–<1, 1–<3, 3–<7, and 7 and greater, or a simple "+" for an above-threshold selectivity value and a "−" for all other selectivity values.

For example, in the case above, the selectivity value of "9" corresponding to the selectivity value itself may be assigned to the word "electromagnetic" in the database. If the highest selectivity value calculated for a word is below a given threshold, that word may be removed from the database, so that the final database of descriptive words includes only those words with an above-threshold selectivity value.

The database of descriptive words forms one aspect of the invention. More generally, the invention provides a database of words contained in texts in one or more libraries of texts from one or more fields, along with associated selectivity values which indicated the "field-specificity" of that word with respect to at least one library field. As just indicated, the database may additionally include, for each term, library and text identifiers (LIDs, CIDs and TIDs) that identify the library fields, classes, and texts containing that term, and text-specific identifiers, such as SIDs and WIDs, and word-specific identifiers, such as VIDs. The database may also include word groups formed of proximately arranged non-generic words, along with associated selectivity values and text identifiers.

Processing a target text into descriptive terms. The concept, invention of event to be searched, in accordance with one aspect of the invention, may be expressed as a group of words and, optionally, word pairs that are entered by the user at the user terminal.

Figure 3:
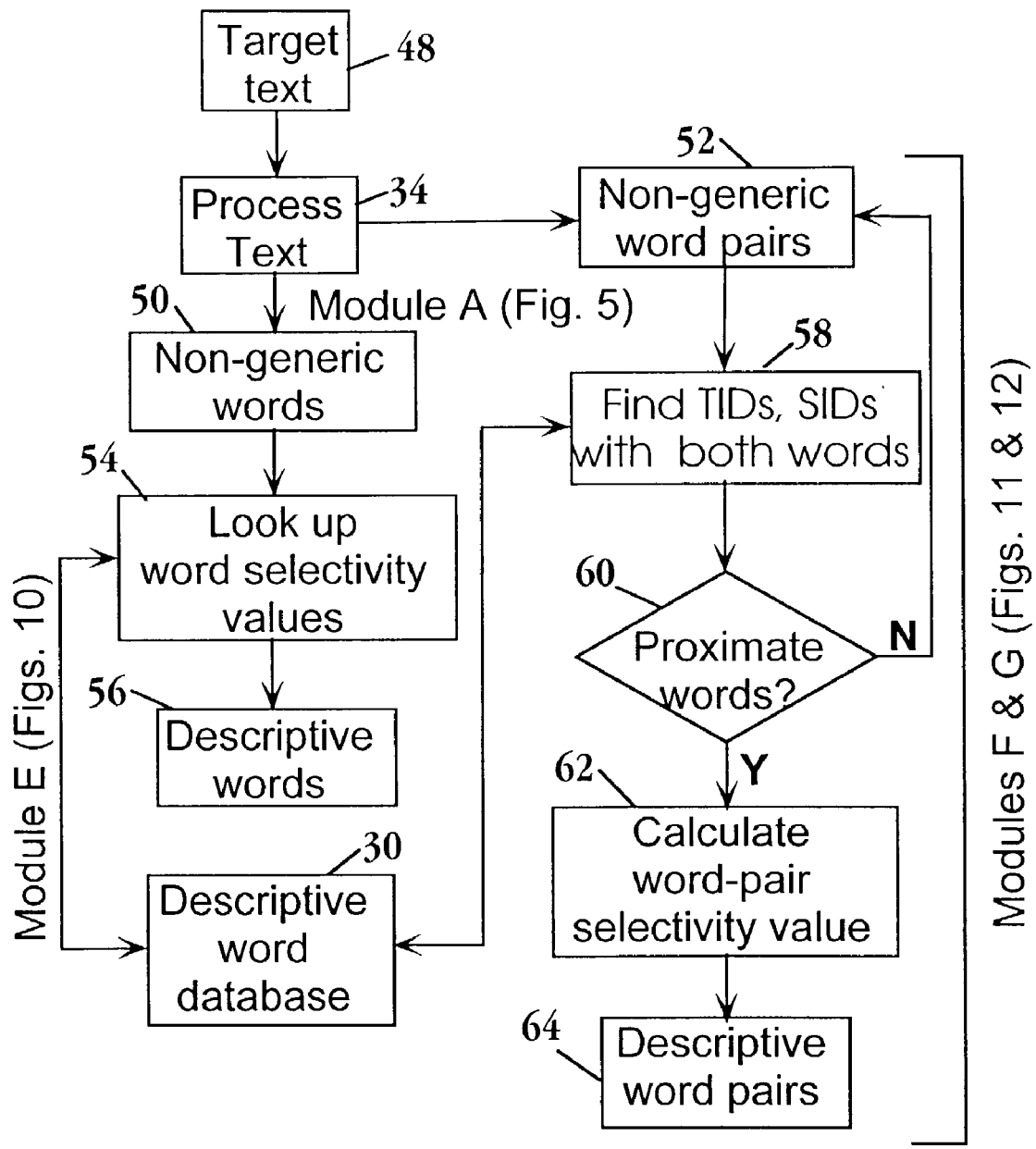
FIG. 3 shows in an overview, flow diagram form, the steps in processing a natural-language input text to generate descriptive search terms.

In a more general embodiment, and with reference to FIG. 3, the user inputs a natural-language target or input text 48 that describes the concept, invention, or event as a summary, abstract or precis, typically containing multiple sentences, or as a patent claim, where the text may be in a single-sentence format. An exemplary input would be a text corresponding to the abstract or independent claim in a patent or patent application or the abstract in a journal article, or a description of events or conditions, as may appear in case notes in a legal reporter.

The input text, which is preferably entered by the user on user computer 24, is then processed by the user computer (or alternatively, by the central computer) to generate non-generic words contained in the text, stored at 50. Optionally, the text processing operation also generates word groups constructed from proximately arranged non-generic words in the text, stored at 52. The processing of target text into non-generic words and word groups, e.g., word pairs is carried out by Module A in the applicable computer, described below with respect to FIG. 5.

With continuing reference to FIG. 3, non-generic words and word pairs (collectively, terms) from the input text (or from terms that are input by the user in lieu of an input text, as above) are then supplied to the central computer which performs the following functions: (i) For each word contained in the target text, the central computer performs the function indicated at 54 of "looking up" the corresponding selectivity value in descriptive word database 30. Applying a default or user-supplied selectivity-value threshold, the central computer saves terms having above-threshold selectivity values as descriptive terms. For example a default or user-supplied word selectivity value of 2 means that the computer would then save, as "descriptive" terms, only those input text words having a selectivity value of 2 or greater. The descriptive words so identified are stored at 56.

Descriptive word pairs, where considered, may be determined or generated in one or two ways. In one approach, the program operates to generate a database of descriptive word pairs in a manner similar to the operation of the program in generating the database of descriptive words. Thus, for example, for each word pair generated from the processed library texts, the program calculates a selectivity value for that word pair in each of the N libraries, and saves the highest value calculated. The word pairs, text identifiers, and corresponding selectivity value(s) for word pairs having an above-threshold selectivity indicator are then assembled into a descriptive word pair database (not shown).

Figure 11:
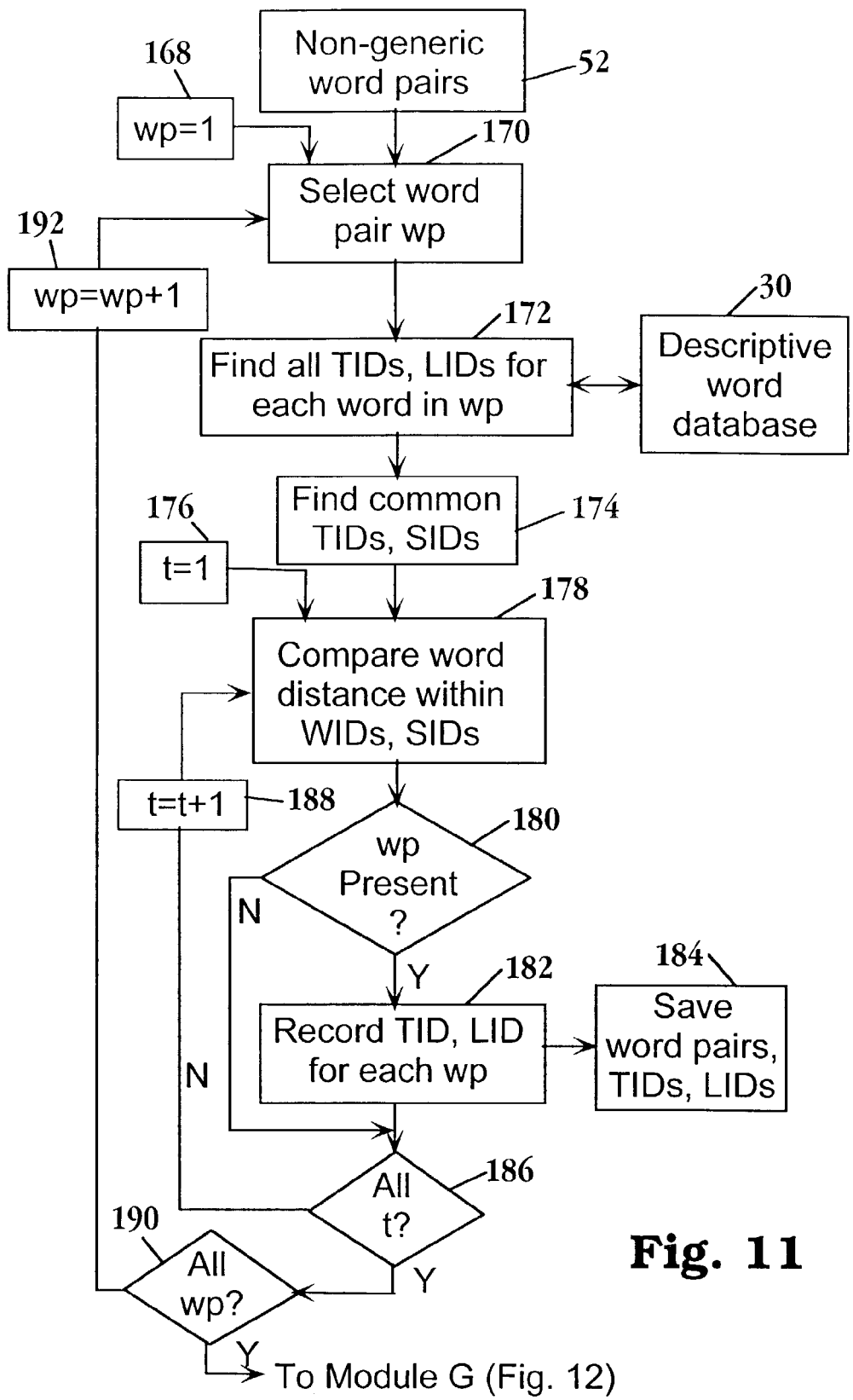
FIGS. 11 and 12 are flow diagrams of Modules F and G, respectively, in the invention, for determining word-pair selectivity values and associated text identifiers.
Figure 12:
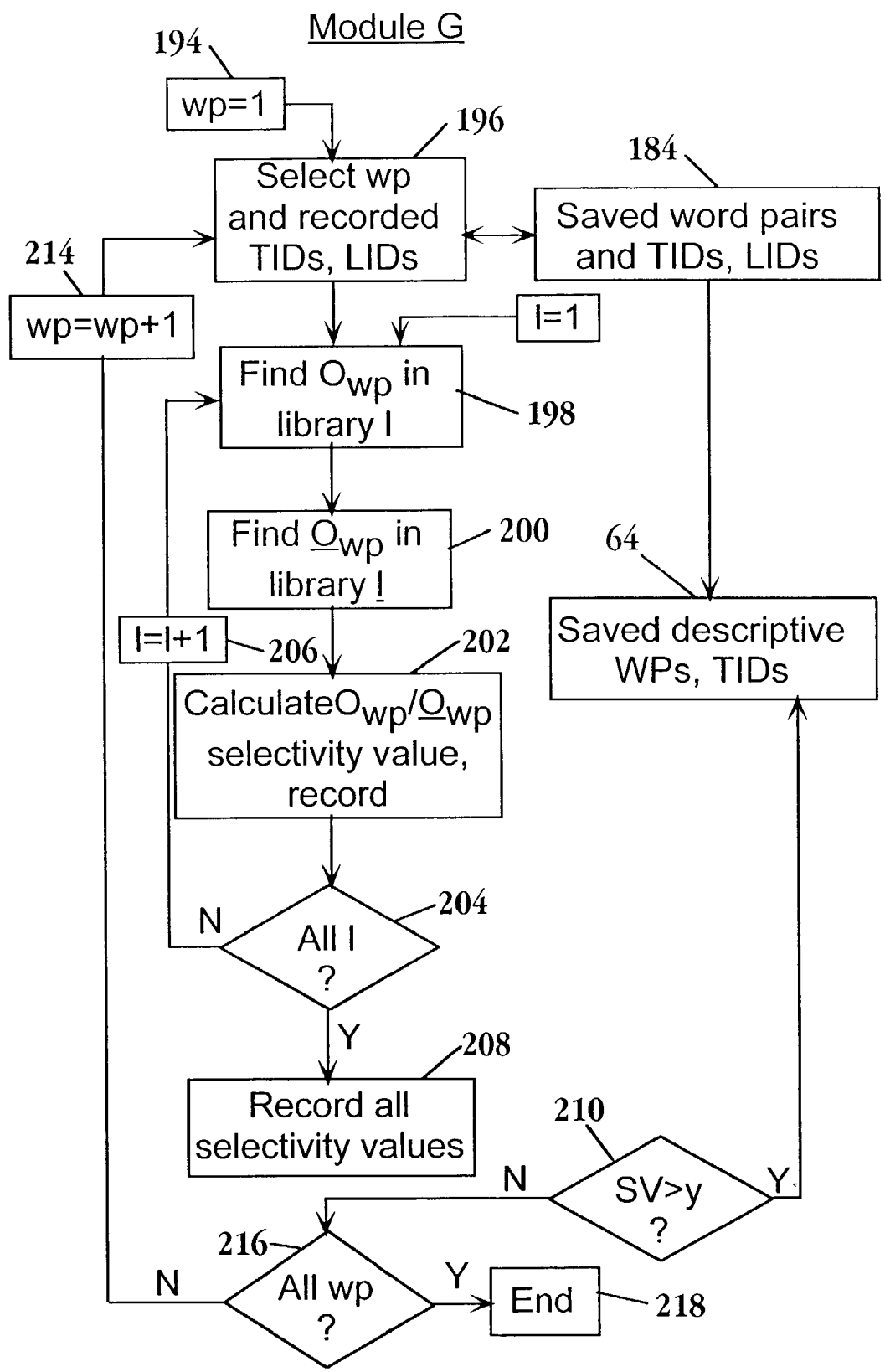

Alternatively, as illustrated in FIG. 3 and described in more detail in FIGS. 11 and 12, selectivity values for word pairs generated from the target text are generated "in real time" using the descriptive word database. Briefly, in this approach, the program consults the descriptive word database to identify TIDs and SIDs of texts and sentences, respectively, that contain a given word pair, the corresponding LIDs of the identified texts (and optionally, CIDs), and the corresponding WIDs of the identified SIDs. The program then uses the WIDs associated with each of the TIDs and associated SIDs to determine, for each text sentence containing a given pair or words, whether the words in the pair are proximately arranged. This is done by comparing the WIDs associated with the two words in the pair in each SID, and determining whether the words are proximately arranged, e.g., have successive or one-removed successive WIDs.

Once this process has been carried out for all texts within each library, the program calculates a frequency of occurrence of that word pair in each of the N different libraries, and from this, calculate the selectivity value of that word pair, similar to the selectivity value calculation performed for individual words, as indicated at 62. The descriptive word pairs are stored at 64.

The descriptive words and optionally, word pairs, stored in the system may be displayed to the user, for one of the following user options. The user may accept the terms as pertinent and appropriate for the search to be conducted, without further editing; the user may add synonyms to one or more of the words (including words in the word pairs) to expand the range of the search; the user may add or delete certain terms; and/or specify a lower or higher selectivity-value threshold for the word and/or word-pair terms, and ask the central computer to generate a new list of descriptive terms, based on new threshold values.

These changes, if made, to the originally generated input-text descriptive terms are returned to the user and/or stored by the central computer for text matching, to be described below with reference to FIG. 4 and FIGS. 12–14.

The invention thus provides, in another aspect, machine-readable storage medium embodying computer-executable code which is operable, when read by an electronic computer, to generate descriptive words from a digitally encoded, natural-language input text that describes a concept, invention, or event in a selected field. The code operates to (i) generate a list of text words, and (ii) select a text word from (i) as a descriptive word if that word has an above-threshold selectivity value in at least one library of digitally encoded texts in a field, where the selectivity value of a word in a library of texts in a field is related to the frequency of occurrence of that word in the library, relative to the frequency of occurrence of the same word in one or more other libraries of texts in one or more other fields, respectively. The threshold selectivity value for a word is preferably at least 1.25, typically 2 or more, in at least one library.

The code may additionally be designed to generate word pairs, typically formed of proximately arranged word pairs, to look up or calculate selectivity values for the word pairs, and select those word pairs having an above-threshold selectivity value.

Conducting a text-matching search. This section provides an overview of the text-matching or text-searching operation in the invention. The purpose of this operation is to identify those texts in a large collection of digitally encoded texts that most closely match a input text in content. The rationale of the search method is based on two strategies for extracting content from natural-language texts, in accordance with the invention. First, the search uses selectivity values to identify those terms, i.e., words and optionally, word groups, having the most pertinence to the meaning of the input text, that is, richest in content. Second, the search considers all high selectivity value terms collectively, and preferably weighted according to selectivity value, to determine an optimal overlap in content-rich terms. This overlap is expressed as a match score. By considering all of the content-rich search terms as a whole, the program finds the highest possible match scores, e.g., global maximum word and word-pair overlap.

As just noted, the match score preferably reflects the relative "content" value of the different search terms, as measured by some function related to the selectivity values of the matched terms. This function is referred to as a match value. For example, if a term has a selectivity value of 8, and the match-value function is a cube root function ($SV^{1/3}$), the match value will be 2. A cube root function would compress the match values of terms having selectivity values to between 1 and 1,000 to 1 to 10; a square root function would compress the same range to between 1 and about 33.

Figure 4:
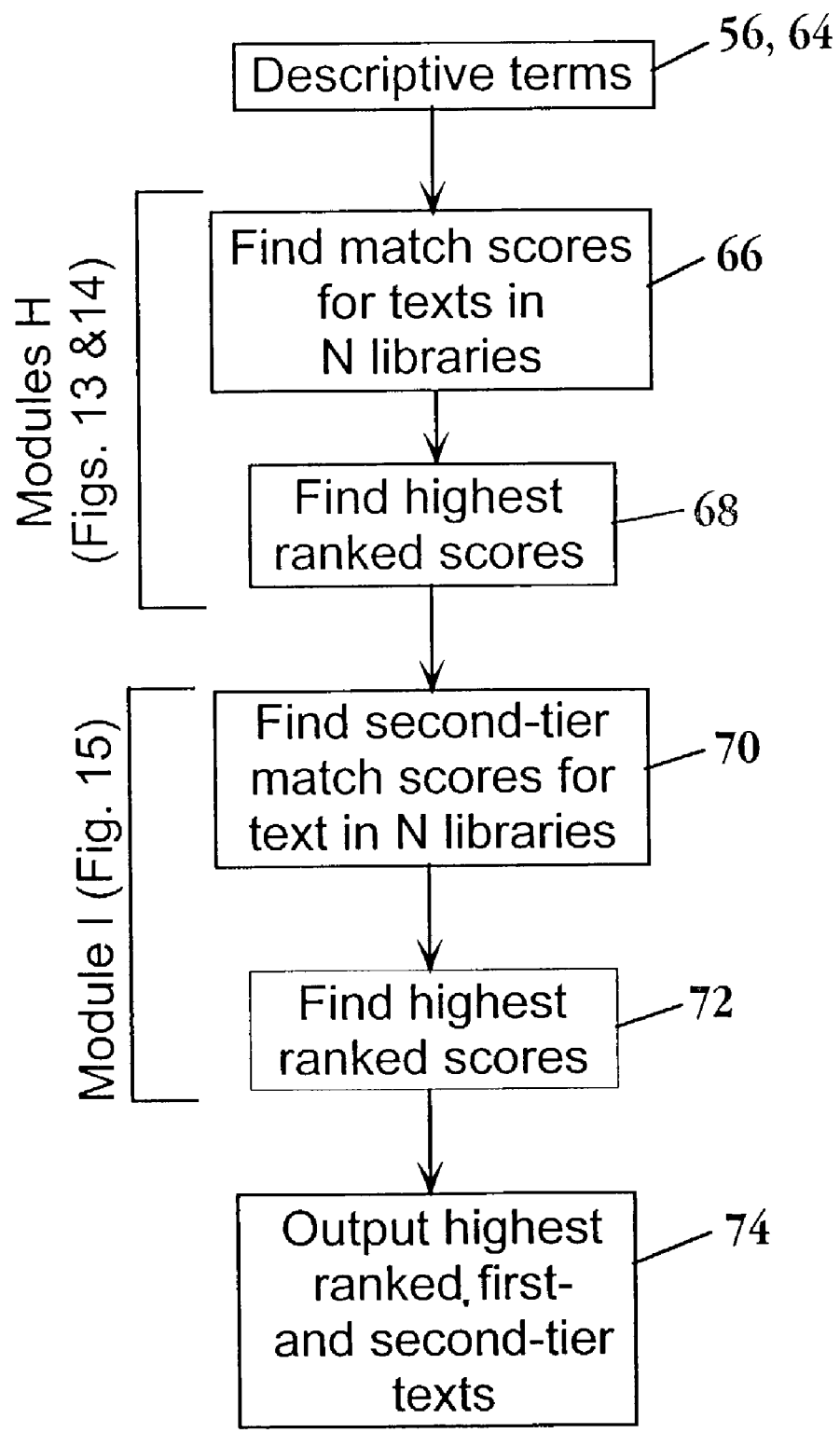
FIG. 4 shows in an overview, flow diagram, steps in a text matching operation performed by the system of the invention.

FIG. 4 shows the overall flow of the components and operations in the text-matching method. The initial input in the method is the descriptive search terms generated from the input text as above, stored at 56 for descriptive words and 64 for descriptive word pairs. For each term (word and optionally, word group), the code operates to look up that term in the target-attribute database, in the case of single words (Module E, FIG. 10), and operates to calculate selectivity values for word pairs, as discussed above with reference to FIG. 3 (Modules F and G, FIGS. 11 and 12). If the selectivity value of the term is at or above a given threshold, the TIDs of all of the texts that contain the term (word) or from which that term (word group) is generated are recorded. The TIDs are placed in an accumulating or update list of text TIDs, each TID associated with one or more terms, and therefore, with one or more match values associated with those terms.

The steps are repeated until each term has been so processed. With each new term, the TIDs and match value associated with that term are added to the update list of TIDs, either as new TID's or as additional match values added to existing TIDs, as described below with reference to FIG. 13. After all of the terms have been considered, the updated list includes each TID (and optionally, associated CID) whose text has at least one of the search terms, and the total match score for the text having that TID. The above operations are indicated at 66 in FIG. 4. The program then applies a standard ranking algorithm to rank the text entries in the update list in a buffer, yielding some selected number, e.g., 25, 50, or 100 of the top ranked matching texts, as indicated at 68.

As will be described below with reference to FIG. 15, Module I, the system may evaluate the search results at this point to identify any target-input terms that are under-represented in the top text matches. If the program identifies a group of descriptive terms, particularly descriptive words, that are under-represented in the top matches, a second search directed to these latter terms may be carried out, as at 70, to identify a second-tier group of texts that give high match scores for the second-tier group of terms, as at 72. The process can be repeated for third-tier or additional tier terms if needed. The output, indicated at 74, may then be a list of highest-ranking first-tier and second-tier texts.

Figure 16:
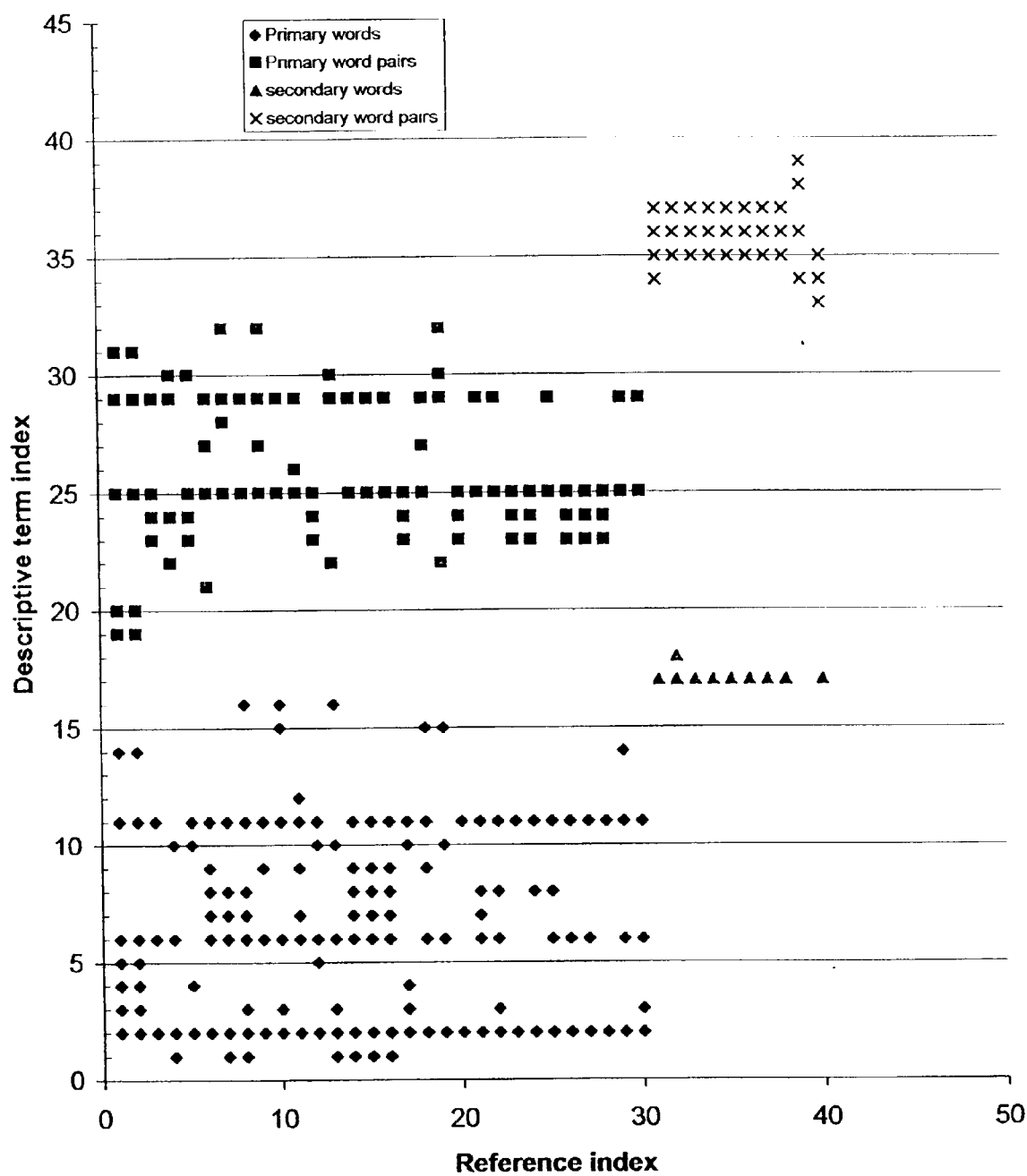
FIGS. 16–18 are scatter plots showing the distribution of matched words and word pairs among the top 20 matched texts from a first-tier search, and the distribution of words and word pairs among the top ten matched texts from a second-tier search.

The input text (patent abstract) from Example 1 illustrates the value of this two-tier (or multi-tier) approach. The text of this example describes a surgical device for monitoring heart rhythms, and that relies on certain signal-processing operations. The initial top match score were all related to surgical devices for monitoring or measuring heart rhythms, and for the most part were from a library of texts in the surgical field. A second tier search directed predominantly to excluded terms in the signal processing field found second-tier texts that had high match values for the new terms, and were also predominantly from the computer field. Together, the two groups of references can be combined to reconstruct most of the critical components of the described invention. The distribution of word and word-pair matches for the top 30 first-tier matches and top 10 second-tier matches are shown in FIG. 16.

Information relating to the top-ranked texts, and/or covering groups may be displayed to the user at display 26. The information displayed at 26 may include information about text scores, and/or matching terms, and the text itself, but not include specific identifying information, such as patent numbers of bibliographic citations. In this embodiment, the user would select those texts which are of greatest interest, based, for example, on the match score, the matching terms, and/or the displayed text of a given reference. This input is fed to the central computer, which then retrieves the identifying information for the texts selected by the user, and supplies this to the user at display 26.

C. Text processing: Module A

There are two related text-processing operations employed in the system. The first is used in processing each text in one of the N defined-field libraries into a list of words and, optionally, word pairs that are contained in or derivable from that text. The second is used to process a target input text into meaningful search terms, that is, descriptive words, and optionally, word pairs. Both text-processing operations use Module A which functions to process a text into terms, that is, non-generic words and optionally, word groups formed proximately arranged non-generic words.

The first step in text processing module of the program is to "read" the text for punctuation and other syntactic clues that can be used to parse the text into smaller units, e.g., single sentences, phrases, and more generally, word strings. These steps are represented by parsing function 76 in the module. The design of and steps for the parsing function will be appreciated form the following description of its operation.

For example, if the text is a multi-sentence paragraph, the parsing function will first look for sentence periods. A sentence period should be followed by at least one space, followed by a word that begins with a capital letter, indicating the beginning of a the next sentence, or should end the text, if the final sentence in the text. Periods used in abbreviations can be distinguished either from an internal database of common abbreviations and/or by a lack of a capital letter in the word following the abbreviation.

Where the text is a patent claim, the preamble of the claim can be separated from the claim elements by a transition word "comprising" or "consisting" or variants thereof. Individual elements or phrases may be distinguished by semi-colons and/or new paragraph markers, and/or element numbers of letters, e.g., 1, 2, 3, or i, ii, iii, or a, b, c. Where the texts being processed are library texts, the sentences, and non-generic words (discussed below) in each sentence are numbered, so that each non-generic word in a text is uniquely identified by an LID, a CID, a TID, one or more SIDs, and one or more WIDs. The record function at 85 in FIG. 5 indicates the operation of the program to records SIDs, WIDs, and VIDs for each non-generic word in the text.

In addition to punctuation clues, the parsing algorithm may also use word clues. For example, by parsing at prepositions other than "of", or at transition words, useful word strings can be generated. As will be appreciated below, the parsing algorithm need not be too strict, or particularly complicated, since the purpose is simply to parse a long string of words (the original text) into a series of shorter ones that encompass logical word groups.

After the initial parsing, the program carries out word classification functions, indicated at 78, which operate to classify the words in the text into one of three groups: (i) generic words, (ii) verb and verb-root words, and (iii) remaining groups, i.e., words other than those in groups (i) or (ii), the latter group being heavily represented by non-generic nouns and adjectives.

Generic words are identified from a dictionary 80 of generic words, which include articles, prepositions, conjunctions, and pronouns as well as many noun or verb words that are so generic as to have little or no meaning in terms of describing a particular invention, idea, or event. For example, in the patent or engineering field, the words "device," "method," "apparatus," "member," "system," "means," "identify," "correspond," or "produce" would be considered generic, since the words could apply to inventions or ideas in virtually any field. In operation, the program tests each word in the text against those in dictionary 80, removing those generic words found in the database.

As will be appreciated below, "generic" words that are not identified as such at this stage can be eliminated at a later stage, on the basis of a low selectivity value. Similarly, text words in the database of descriptive words that have a maximum value at of below some given threshold value, e.g., 1.25 or 1.5, could be added to the dictionary of generic words (and removed from the database of descriptive words).

A verb-root word is similarly identified from a dictionary 82 of verbs and verb-root words. This dictionary contains, for each different verb, the various forms in which that verb may appear, e.g., present tense singular and plural, past tense singular and plural, past participle, infinitive, gerund, adverb, and noun, adjectival or adverbial forms of verb-root words, such as announcement (announce), intention (intend), operation (operate), operable (operate), and the like. With this database, every form of a word having a verb root can be identified and associated with the main root, for example, the infinitive form (present tense singular) of the verb. The verb-root words included in the dictionary are readily assembled from the texts in a library of texts, or from common lists of verbs, building up the list of verb roots with additional texts until substantially all verb-root words have been identified. The size of the verb dictionary for technical abstracts will typically be between 500–1,500 words, depending on the verb frequency which is selected for inclusion in the dictionary. Once assembled, the verb dictionary may be culled to remove words in generic verb words, so that words in a text are classified either as generic or verb-root, but not both. Verb-root words are identified by a VID.

The words remaining after identifying generic and verb-root words are for the most part, non-generic noun and adjectives or adjectival words. These words form a third general class of words in a processed text.

The parsing and word classification operations above produce distilled sentences, as at 84, corresponding to text sentences from which generic words have been removed. The distilled sentences may include parsing codes that indicate how the distilled sentences will be further parsed into smaller word strings, based on preposition or other generic-word clues used in the original operation. As an example of the above text parsing and word-classification operations, consider the processing of the following patent-claim text into phrases (separate paragraphs), and the classification of the text words into nongeneric words (normal font), verb-root words (italics) and remainder words (bold type).

A device for monitoring heart rhythms, comprising:
means for storing digitized electrogram segments including signals indicative of depolarizations of a chamber or chamber of a patient's heart;
means for transforming the digitized signals into signal wavelet coefficients;
means for identifying higher amplitude ones of the signal wavelet coefficients; and
means for generating a match metric corresponding to the higher amplitude ones of the signal wavelet coefficients and a corresponding set of template wavelet coefficients derived from signals indicative of a heart depolarization of known type, and
identifying the heart rhythms in response to the match metric.

The parsed phrases may be further parsed at all prepositions other than "of". When this is done, and generic words are removed, the program generates the following strings of non-generic verb and noun words.

monitoring heart rhythms
storing digitized electrogram segments
signals depolarizations chamber patient's heart
transforming digitized signals
signal wavelet coefficients
amplitude signal wavelet coefficients
match metric
amplitude signal wavelet coefficients
template wavelet coefficients//
signals heart depolarization
heart rhythms
match metric.

Where the texts being processed are library texts, the program records the SIDs, WIDs, and VIDs of the non-generic words in the distilled text, as at 85.

Figure 5:
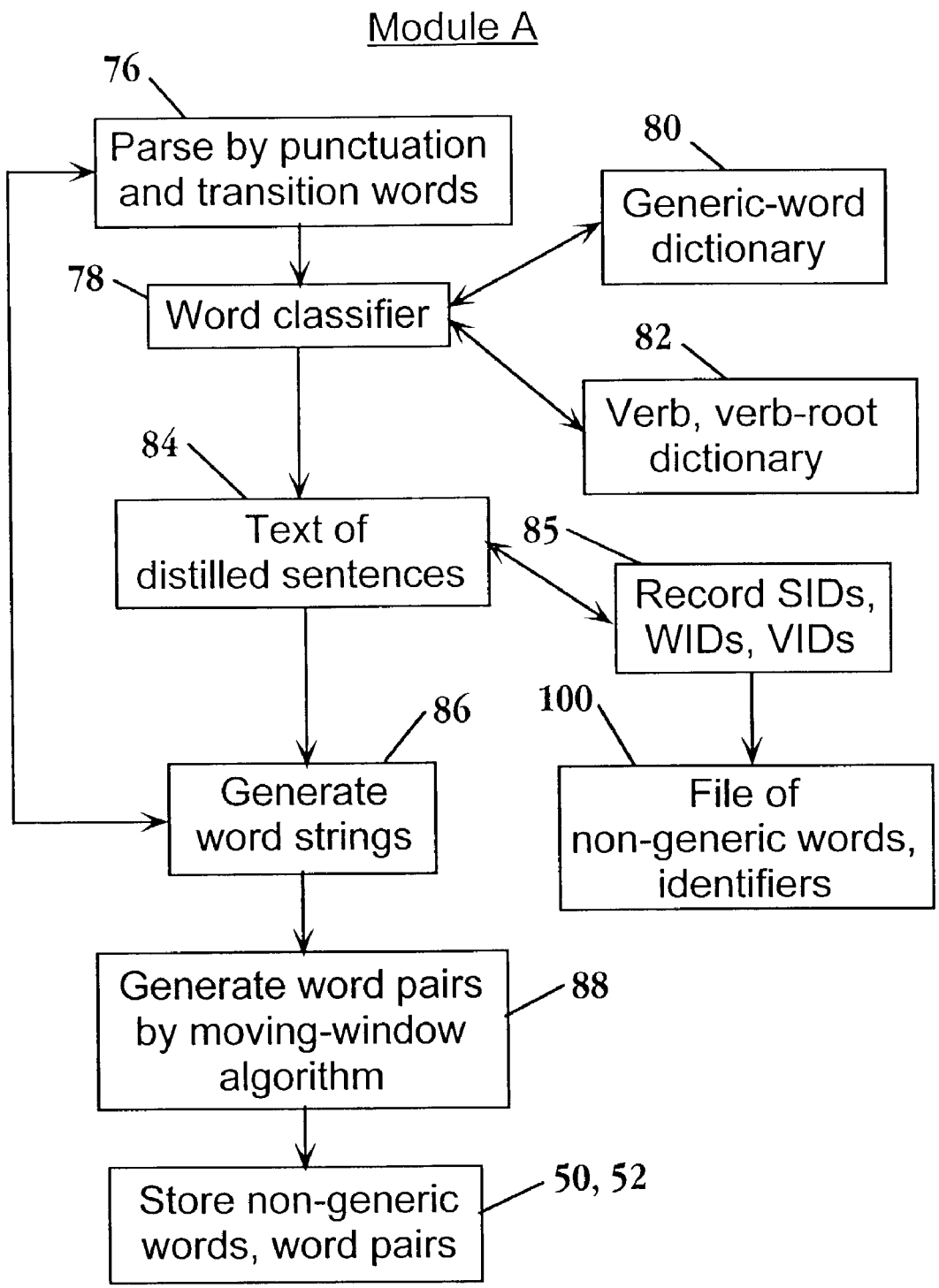
FIG. 5 is a flow diagram of Module A in the invention for processing a digitally encoded text; to generate non-generic words and word pairs.

The operation for generating words strings of non-generic words is indicated at 86 in FIG. 5, and generally includes the above steps of removing generic words, and parsing the remaining text at natural punctuation or other syntactic cues, and/or at certain transition words, such as prepositions other than "of."

The word strings may be used to generate word groups, typically pairs of proximately arranged words. This may be done, for example, by constructing every permutation of two words contained in each string. One suitable approach that limits the total number of pairs generated is a moving window algorithm, applied separately to each word string, and indicated at 88 in the figure. The overall rules governing the algorithm, for a moving "three-word" window, are as follows:

1. consider the first word(s) in a string. If the string contains only one word, no pair is generated;
2. if the string contains only two words, a single two-word pair is formed;
3. If the string contains only three words, form the three permutations of word pairs, i.e., first and second word, first and third word, and second and third word;
4. If the string contains more than three words, treat the first three words as a three-word string to generate three two-words pairs; then move the window to the right by one word, and treat the three words now in the window (words 2–4 in the string) as the next three-word string, generating two additional word pairs (the word pair formed by the second and third words in preceding group will be the same as the first two words in the present group) string;
5. continue to move the window along the string, one word at a time, until the end of the word string is reached.

For example, when this algorithm is applied to the word string : store digitize electrogram segment, it generates the word pairs: store-digitize, store-electrogram, digitize-electrogram, digitize-segment, electrogram-segment, where the verb-root words are expressed in their singular, present-tense form and all nouns are in the singular. The non-generic word Where Module A operates to process an input (target) text, the nongeneric words and word pairs generated as above are stored at 50, 52. Where Module A operates to process library texts, the non-generic words in each text are stored at 100 with the corresponding SID, WID, and VID identifiers. Typically, each non-generic verb-root word is stored in a common verb form, e.g., present tense singular form of the verb.

D. Processing Text Databases to Form a Descriptive-Word Database: Modules B and C This section describes the processing of texts in multiple text libraries to form a database of descriptive words 30.

Processing the library texts. As noted above, each text library used in the construction of a descriptive-word database contains a large number of natural-language texts, such as abstracts, summaries, full text, claims, or head notes, along with reference identifying information for each text, e.g., patent number, literature reference, or legal reporter volume. The two or more libraries used in constructing the descriptive word database contain texts from different fields.

For example, the libraries used in the construction of the database employed in Examples 1–3 are made up of texts from a U.S. patent bibliographic databases containing information about all U.S. patents, including an abstract patent, issued between 1976 and 2000. This patent-abstract database can be viewed as a collection of libraries, each of which contains text from a particular, field. In the method described in Example 1, the patent database was used to assemble six different-field libraries containing abstracts from the following U.S. patent classes (identified by CID);

I. Chemistry, classes 8, 23, 34, 55, 95, 96, 122, 156, 159, 196,201, 202, 203, 204, 205,208,210,261, 376, 419,422,423, 429,430, 502,516;

II. Surgery, classes, 128, 351, 378,433, 600, 601, 602, 604, 606, 623;

III. Non-surgery life science, classes 47, 424, 435, 436, 504, 514, 800, 930;

IV. Electricity classes, 60, 136, 174,191, 200, 218, 307, 313, 314, 315, 318, 320, 322, 323,324, 335, 337,338,361, 363,388, 392,439;

V. Electronics/communication, classes 178, 257, 310, 326, 327, 329, 330, 331, 322, 333,334, 336, 340, 341,342, 343,348, 367, 370, 375,377,379, 380, 381, 385, 386, 438, 455, and VI. Computers/software, classes. 345, 360, 365, 369, 382, 700, 701, 702, 703,704,705,706,707, 708, 709,710,711,712, 713, 714, 716,717,725.

Figure 6:
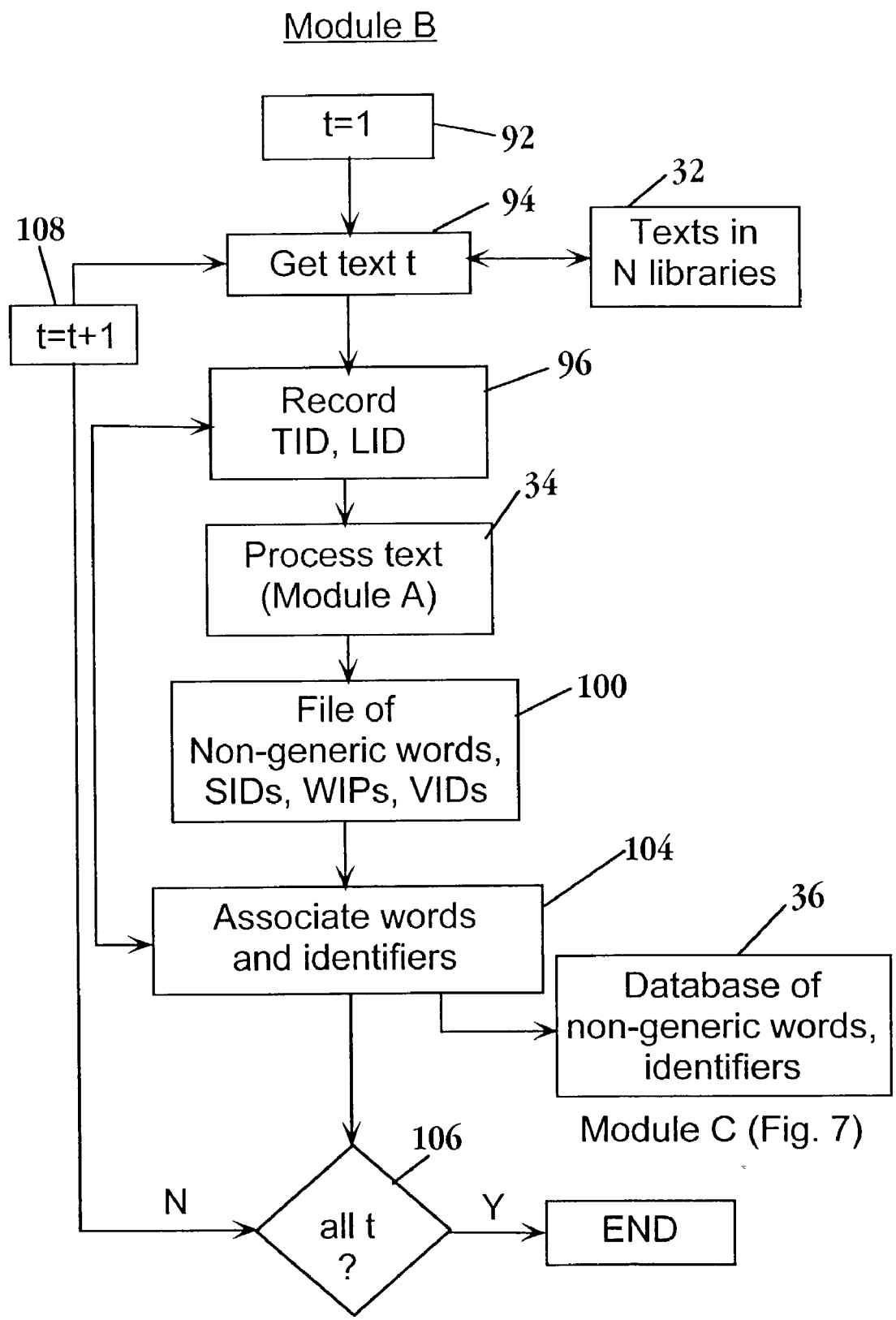
FIGS. 6 and 7 are flow diagrams of Module B and C, respectively, in the invention for generating a database of non-generic words.

Module B shown in FIG. 6 is a flow diagram showing the processing of the texts in the N libraries to form a non-generic word database. The program processes some large number L of texts, e.g., 50,000 to 500-000 texts from each of N libraries. In the flow diagram, "t" represents a text number, beginning with the first text in the first library and ending with the Lth processed text in the Nth library. The text value t is initialized at 1 (box 92), and text t is then retrieved from the collection of library texts 32 (box 94). The library and text identifiers for this text are recorded and stored (box 96).

The text is processed by Module A described above and as indicated at 34, to produce (i) a list of non-generic words and (ii) SIDs, WIDs, and VIDs for each word, stored at 100. The non-generic words processed at 34 and stored at 100 are each associated with the text and library identifiers for that text, as at 104 and then added, with their associated identifiers, to database 36, employing Module C described below with respect to FIG. 7. This process is repeated until all L texts in all N libraries have been considered, as indicated by the logic and increment steps indicated at 106, 108, respectively.

Figure 7:
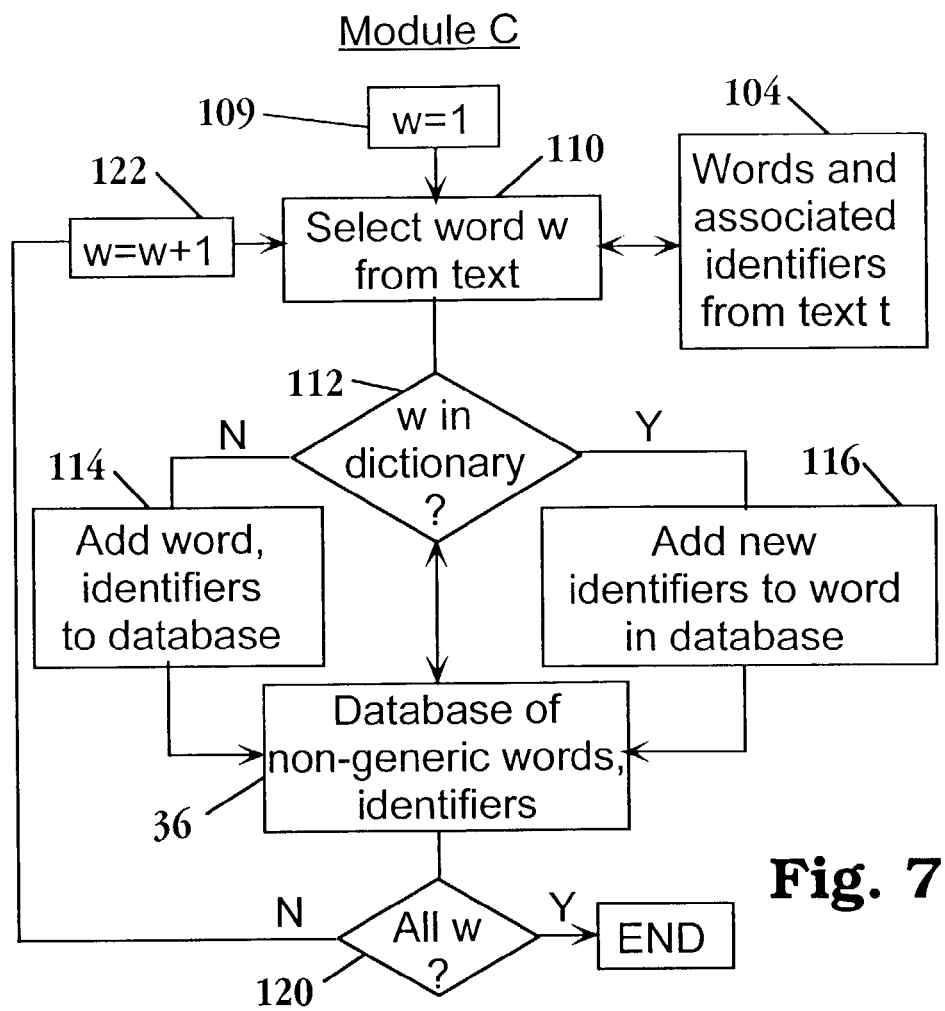

As just noted, the addition of non-generic words from text t is carried out by Module C, shown in flow diagram form in FIG. 7. In this diagram, w represents a word from text t, box 104 contains the non-generic words, and their associated identifiers, generated by Module B for each given text, and database 36 is a database in progress, that is, being modified by the addition of words and/or text identifiers with each new text.

The text word value w is initialized at 1 (box 109). After selecting word w (box 110) from box 104 of words in text t, the program asks, at 112, whether that word is already present in the database of non-generic words. If it is not, the word and its associated identifiers are added to database 36, as at 114. If the word is already in the database, as at 116, the program adds the TID, LID, and CID, and associated SIDs and WIDs for text t to that word in the database. (Typically a database word is assigned a single VID with the initial text entry). This process is repeated until all of the non-generic words from text t have been added to the database, either as new words, or additional text and library identifiers for already-existing words.

When all L texts in all N libraries have been so processed, the database contains each non-generic word found in at least one of the texts, and for each word, the associated VID, a list of TIDs, CIDs, and LIDs identifying the text(s) and associated classes and libraries containing that word, and for each TID, associated SIDs and WIDs identifying the sentence(s) containing that word and word number(s) within each sentence.

Figure 8:
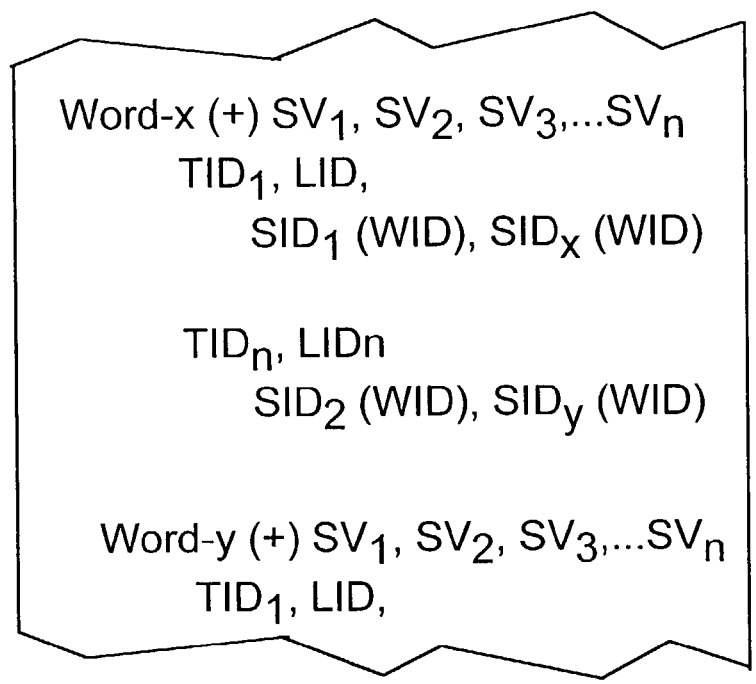
FIG. 8 illustrates the arrangement of words and identifiers in an exemplary descriptive-word database in the invention.

FIG. 8 shows a pair of word entries, indicated word-x, word-y, in a descriptive word database 30 constructed in accordance with the invention. Associated with each word is the word's VID (+ or –), and a plurality (N) of numbers that represent the selectivity values ($SV_N$) of that word in each of a plurality (N) of text libraries, as discussed further below. Listed with each word (in separate columns or fields) are one or more TIDs identifying each of the texts containing that word, and, with each text, the LID, and optionally, CID, identifying the text library and class containing that text. Also associated with each text, (in separate fields or columns) are one or more SIDs in that text which contain that word, and, for each SID, one or more WIDs identifying the word number within that SID. Alternatively, the words in a text may be identified by WIDs alone, by successively numbering the text words without regard to sentence inclusion.

Figure 9:
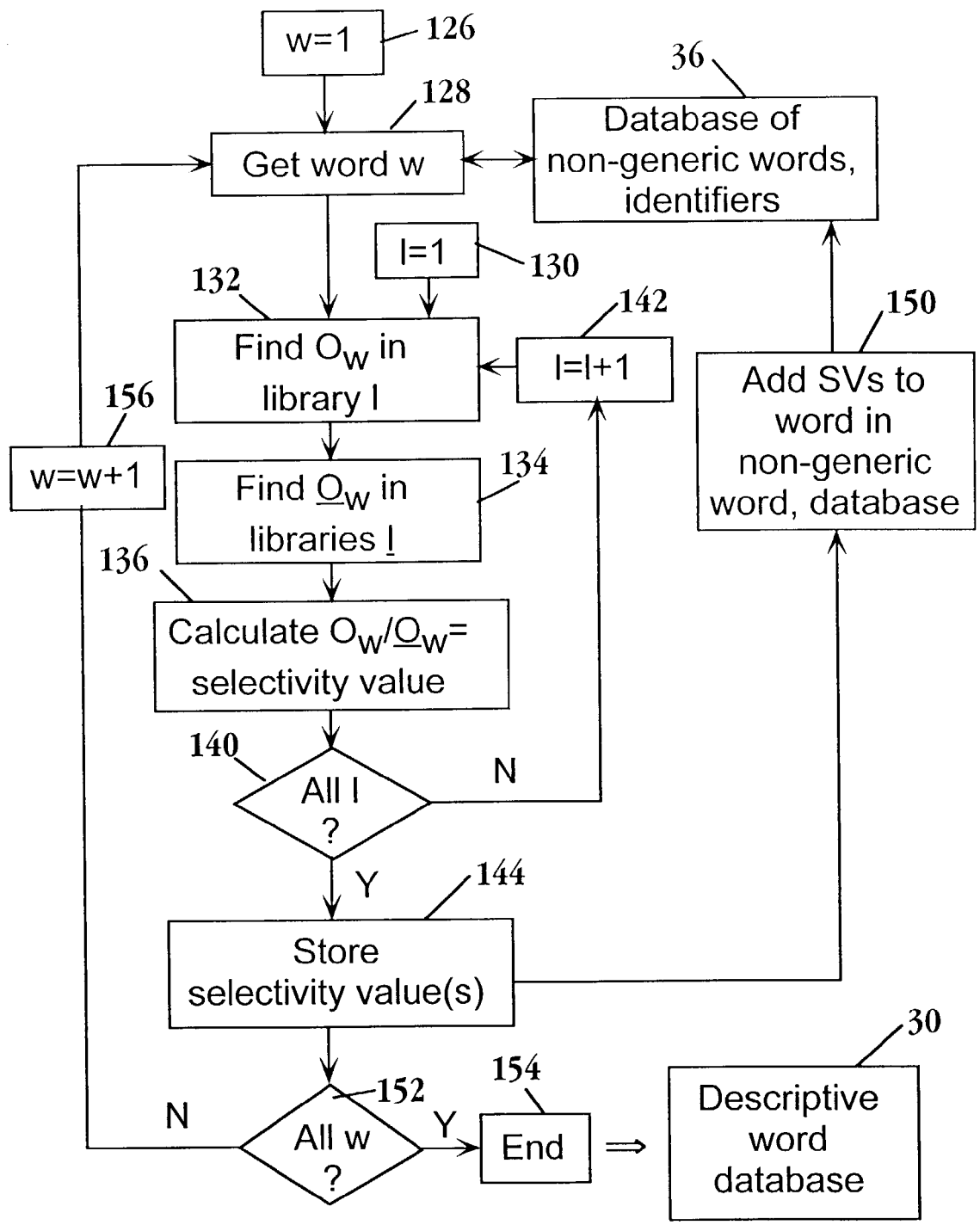
FIG. 9 is a flow diagram of Module D in the invention for calculating selectivity values for non-generic words from a database of non-generic words, to produce a descriptive word database.

Although not shown here, Module B counts and records the total number of different TIDs associated with each LID, for purposes of the selectivity-value calculation described with respect to FIG. 9 below.

Calculating selectivity values. Module D shown in FIG. 9 shows how non-generic word database 36 is used to generate selectivity values for each of the database words, in effect, converting the non-generic word database to the descriptive word database.

The program is initialized at word value w=1 (box 126), meaning the first word in the non-generic word database, and library value I=1 (box 130), meaning the first of the N different libraries. As described above, database 36 contains for each word, associated LIDs and TIDs, and optionally, CIDs, and these identifiers allow the program to identify successive words in a given library, and to determine the number of texts in a given library that contain that word, and optionally, the class or classes containing those texts.

With each new word w, the program counts all of the associated texts (different TIDs) in library I, to determine the frequency of occurrence $O_w$ of that word in library I, as at 132, then counts all of the texts in all other libraries, denoted I̲, to determine the frequency of occurrence $Q_w$ of that term in all other libraries I, as at 134. From these two values, the program then calculates at 136 the selectivity value as $O_w/Q_w$. For example, for a particular w, assume the program finds 125 TIDs containing that word out of a total of 100,000 texts in library I and finds 150 TIDs containing that word in all other libraries, out of a total of 500,000 texts in all I libraries. The frequency of occurrence of the word in library I is thus 125/100,000 and in libraries I̲, 150/500,000. The selectivity value calculated would then be 4.16. Although not shown here, the program may increment a zero value of $Q_w$ to one, to maintain the selectivity value as a finite number.

The selectivity value determination is repeated for each of the N libraries, through the logic at 140, 142, and all of these N values, or the highest value, or some related score is stored at 144. This process is repeated for each non-generic word in database 36, through the logic at 152, 156, until each word in database 36 has either been assigned a selectivity value or values. This operation has now converted database 36 to database 30 which includes a list of all non-generic words contained in all L texts of all N libraries, or alternatively, only those non-generic words having an above-threshold selectivity value. Each word in the database is associated with (i) a selectivity value corresponding to the highest selectivity value among the N libraries, or alternatively, the selectivity value associated with each of the N libraries, (ii) the text identifiers containing that word, (iii) the library identifiers containing associated texts, and (iv) text specific identifiers such as SIDs and WIDs.

It will be appreciated that where each different class of texts (unique CID) is treated as a separate library of texts (CID=LID), the selectivity values of word and word pairs will be determined for each class relative to one or more other classes.

E. Automated Search Method and System

As described briefly above, the text-matching method of the invention involves first, extracting or identifying descriptive terms, i.e., content-rich search terms from an input text (when the input is a natural-language text), and second, using the descriptive search terms so identified to find natural-language texts describing ideas, concepts, or events that are pertinent to the input text. This section considers the two operations separately.

Figure 10:
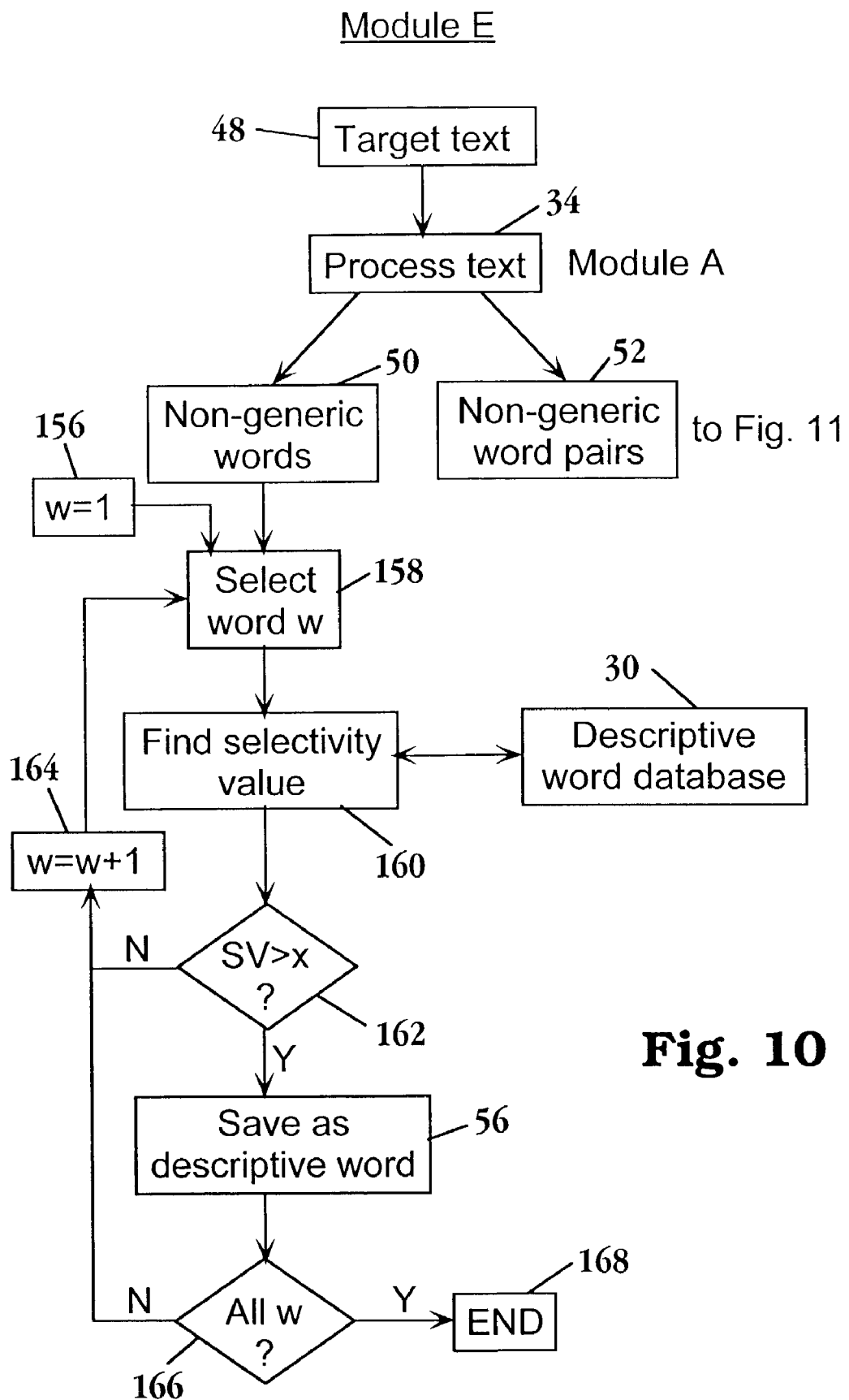
FIG. 10 is a flow diagram of Module E in the system for identifying descriptive words in an input text.

Identifying descriptive words. FIG. 10 is a flow diagram of the operations carried out by Module E of the program for identifying descriptive words in an input text, indicated at 48. This text is a natural-language text, e.g., e.g., an abstract, summary, patent claim head note or short expository text describing an invention, idea, or event.

The input text is processed by Module A as at 34 to produce a list of non-generic words and word pairs formed by proximately arranged word pairs, stored at 50, 52. The stored word pairs are processed as described below with respect to FIGS. 11 and 12, to identify descriptive word pairs, i.e., word pairs having an above-threshold selectivity value.

The non-generic words in buffer 52 are initialized at word value w=1 (box 156), word w is selected (box 158), and the selectivity value(s) of that word is then retrieved from descriptive word database 30, as at 160. If the highest or some specified library-specific selectivity value retrieved is above a preselected threshold value x, e.g., 1.25, 1.5, or 2, the word is saved as a descriptive word at 56. This process is repeated, through the logic of 166,164, until all of the non-generic words in the target text have been so classified.

Identifying descriptive word pairs. Modules F and G, described with respect to FIGS. 11 and 12, take non-generic word pairs from 52 and perform a real-time calculation of the selectivity value of that word pair. The word pairs are initialized to 1 (box 168) and the first word pair is selected from buffer 52, as at 170. The program accesses descriptive word database 30 to find and record all TIDs containing both words, and the associated LIDs. For each TID so identified, the program uses the database to find the one or more associated SIDs in that text containing both words (box 174). With each SID that is identified, the program looks at the WIDs of the two words within that SID, and determines the word distance between the two words, as at 178. In one embodiment, where word pairs are formed of immediately adjacent or once-removed non-generic words, a word pair is noted if the two WIDs in an SID are within one or two numbers of each other, as indicated by the logic at 180.

If a word pair is found in any of the SIDs of a given TID, the program records the TID and associated LIP for that word pair and that text, as at 182, and saves the result to a file 184. If no word pair is found in text t, the program increments text number, through the logic of 186, 188, examining each successive text from 174 for a proximate word pair.

When all texts for a given word pair have been so examined and classified, the program proceeds to the next word pair from file 52, through the logic of 190, 192, until all word pairs have been considered. At this point, file 184 contains a list of all word pairs from file 52, and for each word pair, a list of all TIDs and associated LIDs containing that word pair.

The program operation to determine the selectivity value of each word pair identified from an input text is similar to that used in calculating word selectivity values. Briefly, and with reference to FIG. 12, the word-pair value is initialized at one, and the first wp, with its recorded TIDs and LIDs, is retrieved from file 184. The program initializes the library value at 1, counts all of the associated texts (different TIDs) in that library, to determine the frequency of occurrence $O_{wp}$ of that word pair in library I, as at 198, then counts all of the texts in all other libraries, denoted $\underline{I}$ to determine the frequency of occurrence $\underline{O}_{wp}$ of that same word pair in all other libraries $\underline{I}$, as at 200. From these two values, the program then calculates at 200 the selectivity value as $O_{wp}/\underline{O}_{wp}$.

The word-pair selectivity value determination is repeated for each of the N libraries, through the logic at 204, 206, with the selectivity values for each of the N libraries, or alternatively, only the highest selectivity value being stored at 208. If the highest selectivity value stored is greater than a threshold value y, as at 210, the word pair is identified as a descriptive word pair, and placed in file 64. Conversely, if the highest selectivity value is at or below threshold y, the program ignores that word pair, and goes on to the next word pair, as at 214, continuing this process through the logic of 216, 214, until all word pairs have been so processed (box 218). In effect, the operation is effective to convert file 184, which contains all generated word pairs from a target text, to file 64 which contains only word pairs having some above-threshold selectivity values.

Although not shown here, the program may perform certain additional operations in the following cases: If the actual number of word pair occurrences used in calculating either $O_{wp}$ and $\underline{O}_{wp}$ are below a selected threshold value, e.g., 2–5, the program assumes that the word pair is spurious and discards it, in effect, setting the selectivity value of that word pair to zero. If the actual number of occurrences in $O_{wp}$ is above this threshold, but $\underline{O}_{wp}$ is zero, the program increments $\underline{O}_{wp}$ to one, for purposes of generating a finite selectivity value.

Text matching and scoring. The next step in program operation is to employ the descriptive search terms generated as above to identify texts from the libraries of texts that contain terms that most closely match the descriptive search terms. In one method, the program processes the individual texts in the N different-field test libraries, processing each of the L texts in each library into word and word-pair terms, and calculating target-text word and word pair selectivity values, as above, and then carries out a term-by-term matching operation with each text, looking for and recording a match between descriptive term and terms in each text. The total number of term matches for a text, and the total match score, is then recorded for each text. After processing all of the texts in the database in this way, the program identifies those texts having the highest match scores.

Figure 13:
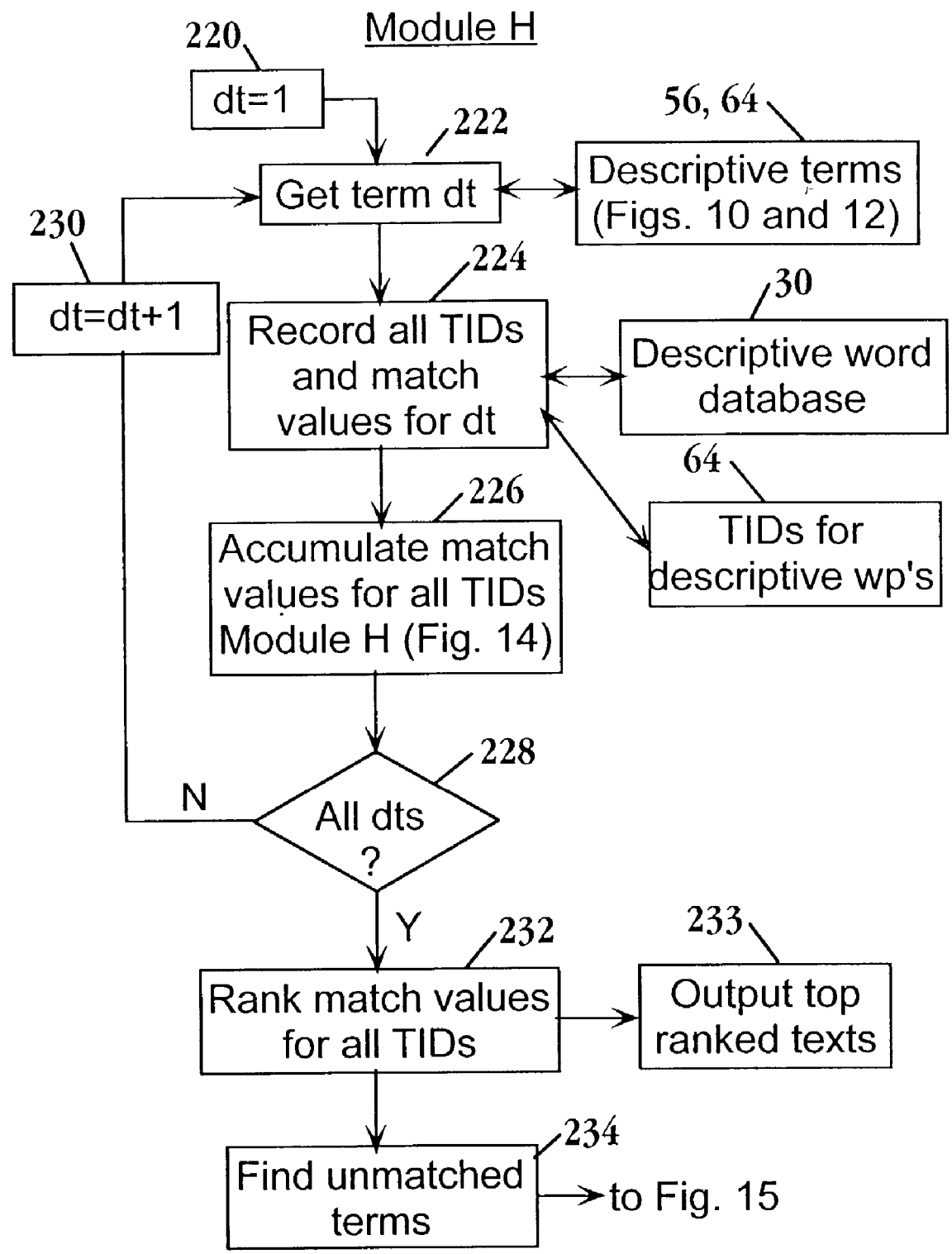
FIGS. 13 and 14 are flow diagrams of Module H in the system for use in text-matching.
Figure 14:
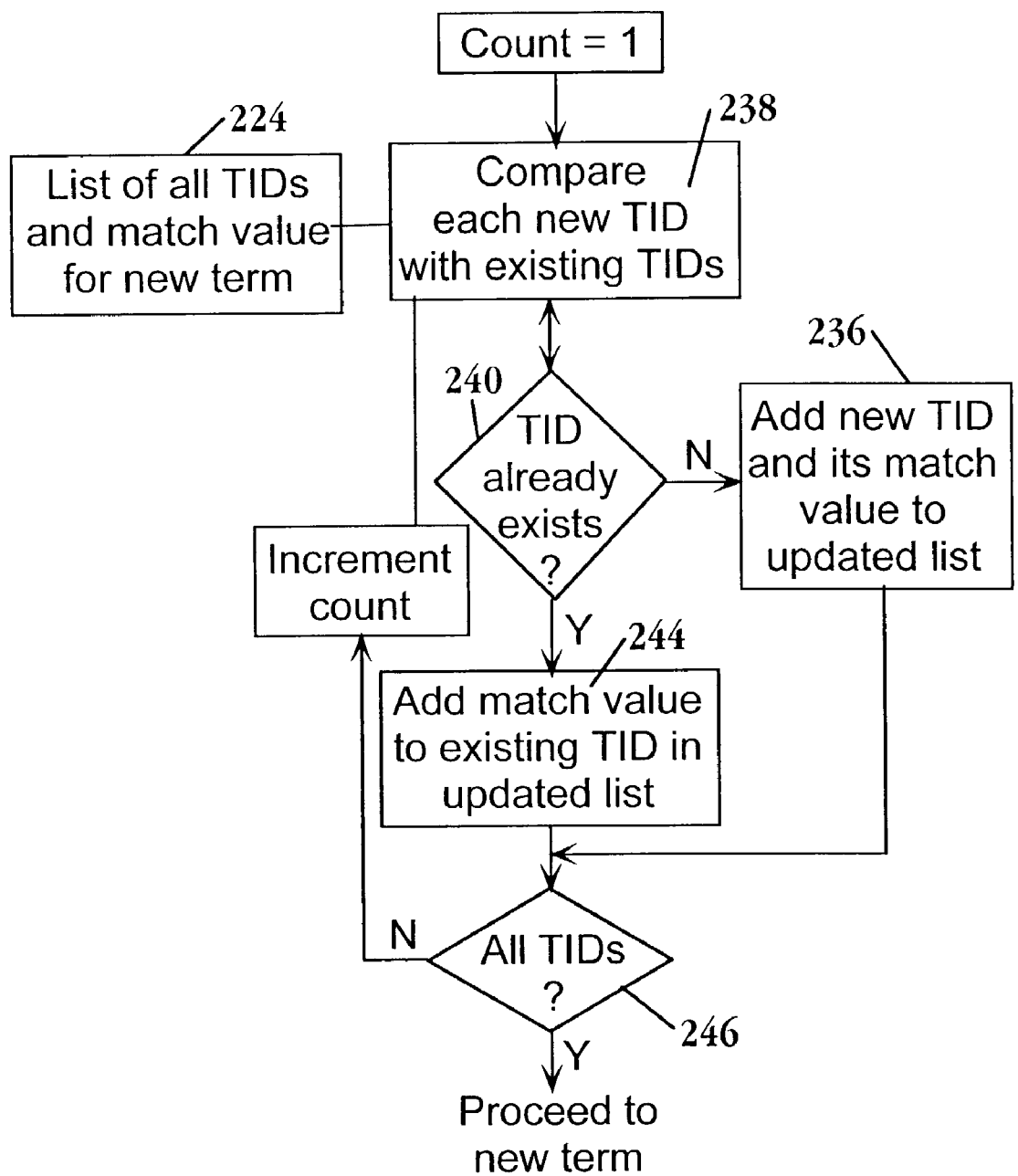

A preferred search method uses descriptive word database 30 and the file 64 of saved descriptive word pairs and their corresponding TIDs, generated as above. The matching operation follows the steps in Module H whose operation is illustrated in FIGS. 13 and 14. In this method, the descriptive terms (descriptive words from 56 and descriptive word pairs from 64) are initialized at 1 (dt=1, box 220), and the program retrieves the first dt, e.g., from descriptive word file 56, as at 222. The program then accesses that word in the descriptive word database (or from file 64 for a word pair term) and records all of the TIDs having that term, and the associated match value for that term (box 224). In an embodiment used for classifying a target text, the program may also record and store the CID for each TID.

In the next operation, the program accumulates the match values for all TIDs on an ongoing basis, as indicated at 226, and described now with reference to FIG. 14. With each new descriptive term, the list of matching TIDs and associated match value are placed in a file 236 which serves as an updated list of all TIDs and associated match values, reflecting the total number of descriptive terms for each listed TID. Each new descriptive term generates a new list of TIDs and match values, indicated at 224 in FIGS. 13 and 14. Each TID in list 224 is compared with the TIDs from file 236, as indicated at 238. If the TID from file 224 being compared already exists in list 236, the match value of the new descriptive term is added to that existing TID, as at 244. If the TID being compared does not already exist in list 224, the new TID, along with the descriptive-term match value (and optionally, the CID) is added to the list. This process is repeated, as at 246, until each TID containing the descriptive word under consideration has been so processed. Thus, for each new descriptive term, the corresponding match value for all texts containing that term is either added to an already existing TID or added to a new TID.

Once this processing is complete for a given descriptive word, and with reference again to FIG. 13, the program then considers the next dt, through the logic of 228, 230, until all of the descriptive terms generated from the target text have been considered. With each new term, all of the TIDs associated with that term, and the respective match scores are placed in list 236. When the last term has been processed, each TID in the list has associated with it, a match score for all of the descriptive terms found in that text. A total match score for each TID can thus be calculated by adding the match values associated with each TID. These final scores are then ranked, using a standard number-ranking algorithm (box 232), and the top-ranked texts, e.g., texts with the top 25, 50, or 100 match scores, are then outputted at 233. Examples 1–3 give the top-ranked 30 matches for each target text, identified by US patent number.

Second-tier searching. The program may also function to find descriptive terms that are either unmatched or poorly matched (under-represented) with terms in the top-score matches from the initial (first-tier) search, as indicated at 234 in FIG. 13. This function is carried out by Module I, whose operation is shown in FIG. 15. As seen, the program takes the top-score matches from the original search (box 233), and initializes each descriptive term (word and optionally, word group) from the target text to 1 (box 250). The total number of top-score TIDs containing that term is then counted and recorded, at 252, to determine the "representation" of that term in the top-ranked texts. If the number of texts containing the term is below a given threshold n, e.g., 2–3, the term is recorded at 258 and set aside for a second-tier search. The program then proceeds to the next descriptive term, through the logic at 260, 256, until all the target terms have been processed. The result is a list 262 of target-text descriptive terms that are either not present or present only in one or few of the top-ranked texts.

Figure 15:
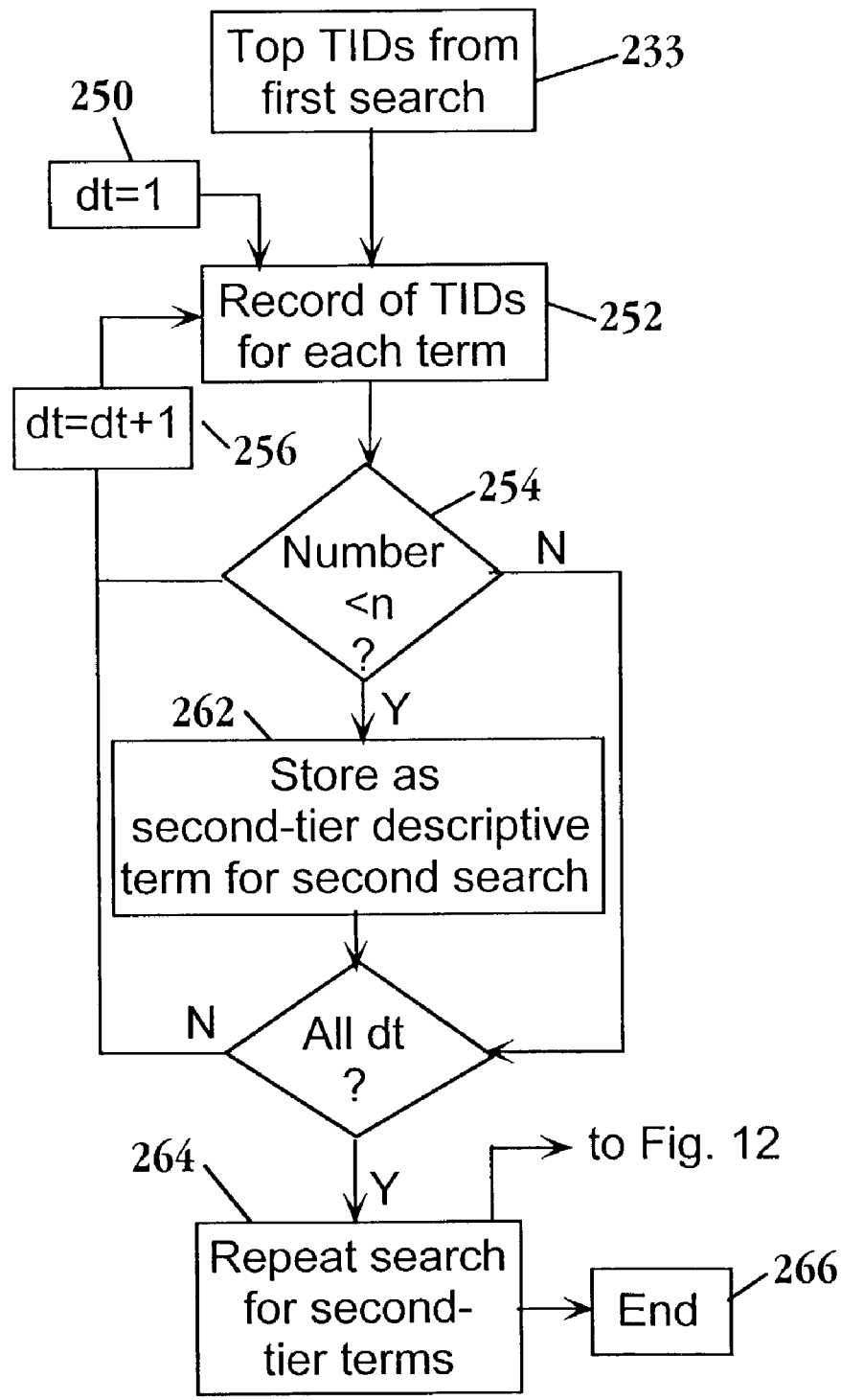
FIG. 15 is a flow diagram of Module I in the invention for identifying terms for a second-tier search.

As indicated at 264 in FIG. 15, this group of under-represented terms is then used to conduct a second-tier search, following the search process described above, but limited to those search terms identified at 262. After carrying out the second-tier search, and identifying the top match-score texts, the descriptive terms may then be reevaluated for descriptive terms that may still be under-represented, and carry out third-tier or more additional searches, limited to the under-represented terms.

Target-text classification. The system may also operate to classify the target input text into one or more recognized classes of texts, e.g., patent classes or subclasses, legal specialties, technical fields. In this embodiment, the program records a classification identifier (CID) for each text identified in the text-matching search. After identifying the top-matching texts, the program examines these texts for CIDs, and selects as the text classification, the CID associated with the highest ranking text, or the CID most heavily represented in terms of numbers, among some group of highest-ranking texts, or multiple classes corresponding to the class representation among the highest-ranking texts. This classification procedure may be repeated for texts identified in the above second-tier searching.

F. Text Processing and Text-Matching Results

Examples 1–3 below illustrate the type of results obtainable for the text-processing and text-matching operations described above. In each example, the target text is combined text of the abstract and exemplary independent claim of a recently issued U.S. patent. The libraries of texts that are searched, and which are used in generating the selectivity values of the target-text words and word pairs are the six patent superclasses identified in Section B above.

Each target text (combined abstract and broad claim) was processed to yield a distilled text in which verb-root words, and remaining non-generic words have been so classified. A selectivity value for each term was then identified, and the terms were classified as descriptive if their selectivity values were above 2.5 in any of the six libraries. The selectivity values of the descriptive terms are given with the target text in each example.

A text-matching operation was then carried out to identify top-matched texts in the collective (six) text libraries. The top-ranked 100 texts were analyzed for representation of descriptive terms, and a subset of underrepresented terms were identified for a second-tier search.

Figure 17:
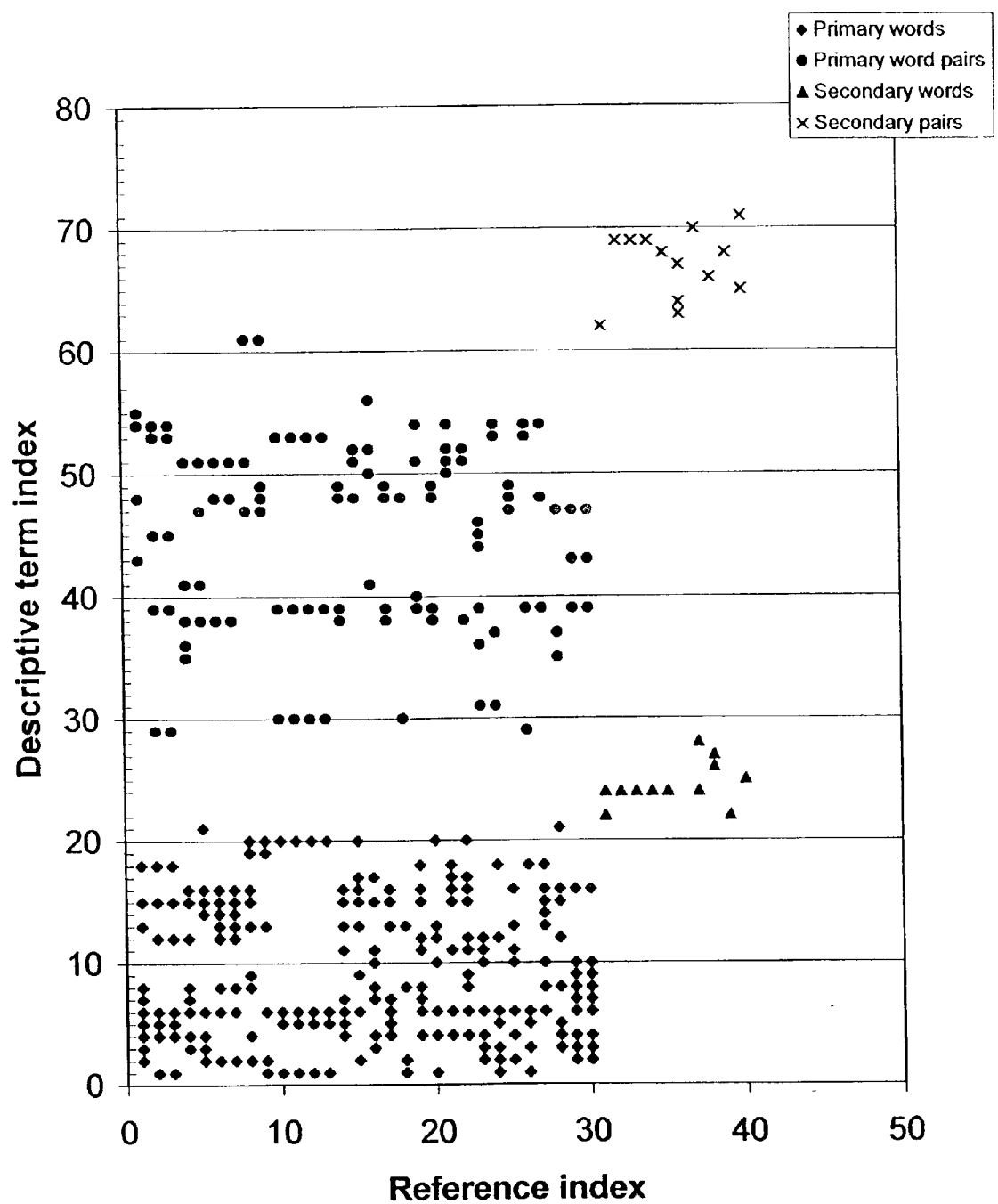
Figure 18:
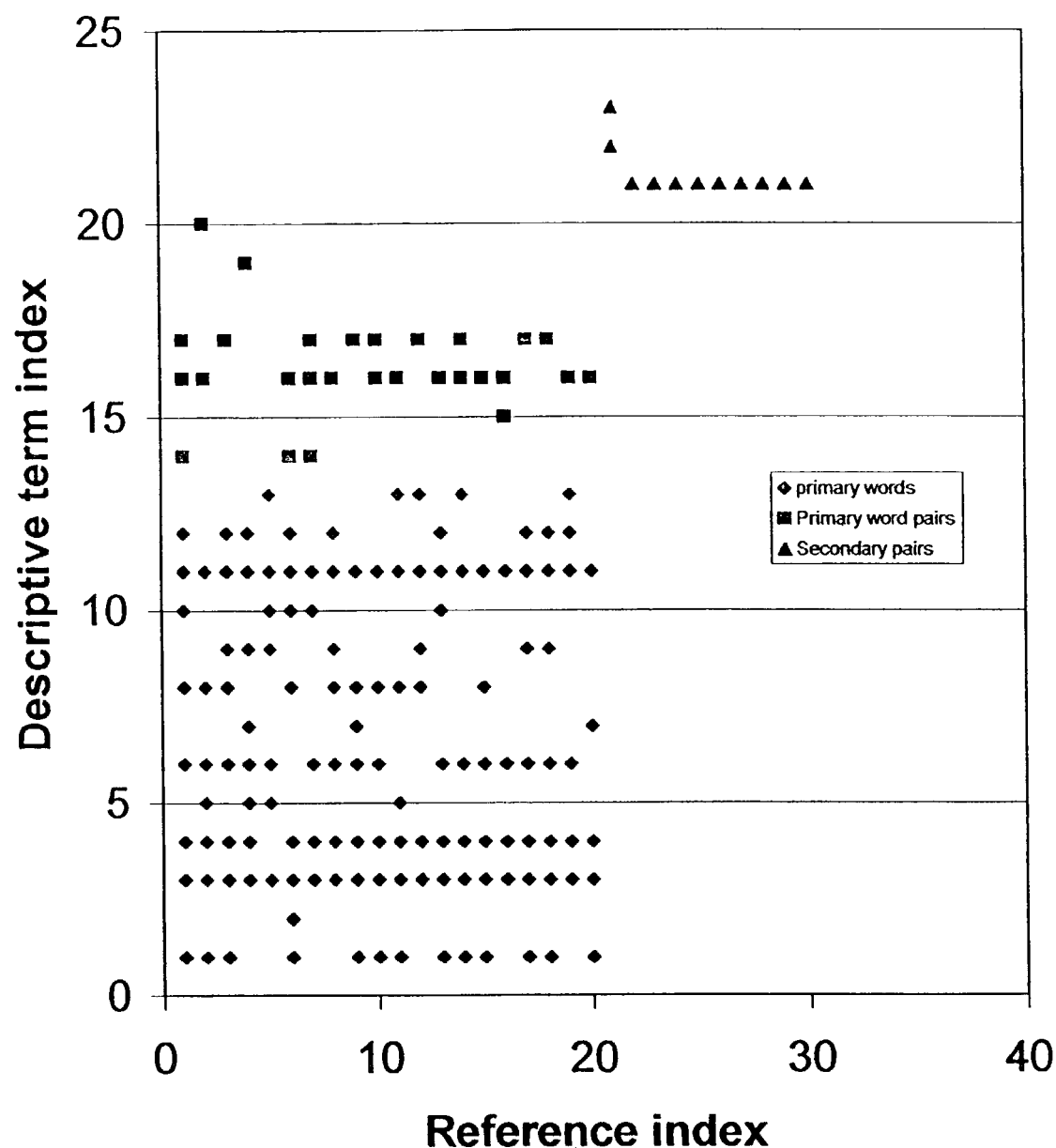

The results of the searches in the three examples are given in scatter graph form in FIGS. 16–18. In each graph, the representation of target-text descriptive words and word pairs for the top-ranked 30 texts (Reference Texts 1–30) are indicated by the symbols identified in each figure. As seen, the top ranked "first-tier" texts contain a strong term overlap with target-text terms, e.g., 7–15 matching terms. Word and word-pair matches for the top ten second-tier texts are indicated at Reference Texts 31–40. It can be appreciated from the graphs that the second-tier search successfully picked up additional groups of descriptive terms not present in the top-ranked text from the first-tier search.

From the foregoing, it can be appreciated how various objects and features of the invention have been achieved.

From the foregoing, it can be appreciated how various objects and features of the invention have been achieved. The system is capable of processing text in a completely automated fashion, i.e., without user intervention or guidance, to process a text into key (descriptive) words and word groups, for purposes of text-match searches. In particular, no pre-classification decision is required, nor does the user even need to read or understand of the input text in order to perform an effective search.

Following text processing, the text-matching operation locates a desired number of top-ranked hits based on an overall match score that is related to the overall number of matches with the target-text descriptive terms. These top-ranked references represent global maxima for descriptive term overlap, rather than local maxima based on overlap of some selected set of terms, as is characteristic of manually searching.

As part of the automated operations of the system, search terms that underrepresented in an initial search are automatically identified, and used to launch one or more additional search for suitable "secondary" references. Such secondary references may be found in technical fields unrelated to the initial-search references, allowing the user to locate "covering" references from a variety of different disciplines. In addition, the search can identify a recognized class or classes for the top ranked texts, allowing the target text to be classified, and/or to allow additional searching to be focused in the identified class(es).

Finally, the text-processing and search operations can be conducted in real time or near real-time, using a word dictionary to locate descriptive terms, to identify descriptive word pairs, and to carry out the term matching operations of the system.

EXAMPLE 1

Text processing and matching with respect to U.S. Pat. No. 6,393,316, for "METHOD AND APPARATUS FOR DETECTION AND TREATMENT OF CARDIAC ARRHYTHMIAS"

Abstract: A device for monitoring heart rhythms. The device is provided with an amplifier for receiving electrogram signals, a memory for storing digitized electrogram segments including signals indicative of depolarizations of a chamber or chamber of a patient's heart and a microprocessor and associated software for transforming analyzing the digitized signals. The digitized signals are analyzed by first transforming the signals into signal wavelet coefficients using a wavelet transform. The higher amplitude ones of the signal wavelet coefficients are identified and the higher amplitude ones of the signal wavelet coefficients are compared with a corresponding set of template wavelet coefficients derived from signals indicative of a heart depolarization of known type. The digitized signals may be transformed using a Haar wavelet transform to obtain the signal wavelet coefficients, and the transformed signals may be filtered by deleting lower amplitude ones of the signal wavelet coefficients. The transformed signals may be compared by ordering the signal and template wavelet coefficients by absolute amplitude and comparing the orders of the signal and template wavelet coefficients. Alternatively, the transformed signals may be compared by calculating distances between the signal and wavelet coefficients. In preferred embodiments the Haar transform may be a simplified transform which also emphasizes the signal contribution of the wider wavelet coefficients.

Claim 1: A device for monitoring heart rhythms, comprising:
means for storing digitized electrogram segments including signals indicative of depolarizations of a chamber or chamber of a patient's heart;
means for transforming the digitized signals into signal wavelet coefficients;
means for identifying higher amplitude ones of the signal wavelet coefficients; and
means for generating a match metric corresponding to the higher amplitude ones of the signal wavelet coefficients and a corresponding set of template wavelet coefficients derived from signals indicative of a heart depolarization of known type, and identifying the heart rhythms in response to the match metric.

Descriptive Terms, Including Highest Calculated Selectivity Value:

monitor (3.31057); heart (34.1952); rhythms (15.7353); amplify (6.0772); electrogram (265); signal (2.76735); memory (17.5557)store (7.12355); digitize (3.40276); depolarize (11.9697); patient (27.1018); software (8.09338); wavelet (5.83333); derive (7.5902); filter (2.92216); delete (3.86427); order (2.55556); calculate (2.66323); wider (2.74764).

heart—rhythms (19.1667); amplify—signal (7.42032); electrogram—signal(18); memory—signal (22.0775); digitize—store (7.22798); digitize—segment (3.125); segment—signal (6.37931); depolarize—signal (12); chamber—patient (42.5); chamber—heart (230); heart—patient (286.25); microprocessor—software (2.91667); digitize—transform (7.5); digitize—signal (4.61637); coefficients—signal (2.85714); coefficients—wavelet (7.5); coefficients—transform (11.818); transform—wavelet (8.18182); amplitude—signal (3.27957); coefficients—higher (2.89474); heart—signal (750); depolarize—heart (85); filter—transform (3.61111); filter—signal (3.87967); compare—signal (3.36788); calculate—distances (3.08333).

Top 20 primary hits, listing US patent numbers (middle seven digits), and field of text library.

abs 053953932(86.6501, surgery) abs 054921287(86.6501, surgery)
abs 059546611(84.889, surgery) abs 050835653(75.4812, surgery)
abs 060583274(73.5311, surgery) abs 046257306(72.8618, surgery)
abs 043677533(72.3636, surgery) abs 043643973(71.2296, surgery)
abs 060979836(67.035, surgery) abs 052923487(66.6022, surgery)
abs 050147013(66.4361, surgery) abs 052756211(66.3428, surgery)
abs 048650366(66.2776, surgery) abs 050923307(63.5565, surgery)
abs 049586327(63.5565, surgery) abs 053185935(63.5565, surgery)
abs 051333503(62.8465, surgery) abs 061204439(62.5671, surgery)
abs 050585991(61.493, surgery) abs 059719338(60.2998, surgery)

Top 10 secondary hits, listing US patent numbers (middle seven digits), and field of text library.

abs 054977770(26.1651, surgery) abs 056199988(23.4774, surgery)
abs 061050156(21.9082, computers) abs 060758783(21.9082, computers)
abs 059237856(21.9082, computers) abs 057579741(21.9082, computers)
abs 059908238(21.9082, electro) abs 055614310(21.9082, electro)
abs 049167430(21.4166, electro) abs 055507883(18.8505, electro) abs

EXAMPLE 2

Text processing and matching with respect to U.S. Pat. No. 6,391,051 for "PULL BACK STENT DELIVERY SYSTEM WITH PISTOL GRIP RETRACTION HANDLE"

Abstract: A stent delivery system for delivering a self-expanding stent to a predetermined location in a vessel includes a catheter body having an axial guidewire lumen and a pull-wire lumen. A medical device such as a self-expanding stent is held in a reduced delivery configuration for insertion and transport through a body lumen to a predetermined site for deployment. The stent is carried axially around the catheter body near its distal end and held in its reduced configuration by a retractable outer sheath. A proximal retraction handle is connected to the proximal end of the catheter body and includes a pistol grip trigger engaging a rachet mechanism, which is connected to a pull-wire which extends through the pull-wire lumen and is connected to the retractable outer sheath.

Claim 1. A delivery system for delivering a medical device to a predetermined location in a body lumen, the delivery system comprising:
  a catheter body having proximal and distal ends for transporting a medical device to a predetermined site in a body lumen for deployment;
  a medical device having proximal and distal ends carried by the catheter body near the distal end, and
  a retractable outer sheath having proximal and distal ends and surrounding the medical device and maintaining the medical device in a delivery configuration where the medical device has a reduced radius along its entire axial length, wherein the proximal end of the retractable outer sheath is tapered to form a smooth a traumatic transition between the retractable outer sheath and the catheter body which aids in extraction of the delivery system from a body lumen, the proximal end of the retractable outer sheath comprising a thermally molded extrusion swaged in place with a marker band.

Descriptive words and pairs:

surgical (40.7947); stent (23.3333); self-expanding (22.5); vessel (2.98832); catheter (68.8235); body (3.97348); lumen (41.9298); medical (15.7959); insert (3.74044); deploy (7.06731); retract (5.00928); sheath (11.3492); pistol (5); grip (5.03421); engage (2.70128); rachet (17.5); taper (2.95508); extract (3.42761); thermally (2.73833); mold (21.2975); extrusion (44.6284).

deliver—stent (5); locate—vessel (6.66667); catheter—locate (415); catheter—vessel (116.667); body—vessel (17.1429); body—catheter (83.4615); axial—catheter (27); axial—body (2.71277); body—guide (6.49425); axial—guide (3.69565); axial—lumen (18); guide—lumen (83.3333); deliver—reduce (3.75); insert—transport (11.6667); body—insert (15.8156); body—transport (5); body—lumen (82.5); carry—catheter (70); catheter—hold (28); body—hold (4.0625); outer—reduce (3.68421); outer—retract (31.6667) retract—sheath (22); outer—sheath (11.875); connect—retract (8.21429); body—grip (8.1579); grip—pistol (14.1667); grip—trigger (22.5); engage—grip (8.07692); engage—trigger (3.125); extend—lumen (127.143); connect—lumen (185); deliver—medical (5); body—locate (8.25); locate—lumen (15); body—deliver (4.6875) deliver—lumen (21.6667); catheter—lumen (92.2727); catheter—deliver (37.8571); carry—medical (8); catheter—retract (85); body—retract (24.1667); body—outer (3.43333); sheath—surround (16.25); medical—sheath (7); medical—reduce (20); axial—reduce (6.95652); sheath—taper (20); catheter—outer (74.1667); catheter—sheath (142.5); body—sheath (25); lumen—outer (135).

Top 20 primary hits, listing US patent numbers (middle seven digits), and field of text library.

abs 059680520(326.184, surgery) abs 054586151(176.323, surgery)
abs 061136077(176.323, surgery) abs 057828555(176.323, surgery)
abs 055077684(176.323, surgery) abs 055340075(122.499, surgery)
abs 053706102(119.588, surgery) abs 057761400(117.812, surgery)
abs 055730078(106.918, surgery) abs 060130849(103.61, surgery)
abs 058534180(103.61, surgery) abs 059805331(100.116, surgery)
abs 061464155(97.7341, surgery) abs 058240411(97.6733, surgery)
abs 06126685&(97.6733, surgery) abs 058911545(96.5749, surgery)
abs 060247398(95.1731, surgery) abs 058206078(94.771, surgery)
abs 060275103(92.5606, surgery) abs 058003843(91.0324, surgery)

Top 10 secondary hits, listing US patent numbers (middle seven digits), and field of text library.

abs 060396946(22.1253, surgery) abs 051105195(20.04, materials)
abs 056441690(18.6828, electro) abs 060903376(18.6828, materials)
abs 060997907(18.6828, materials) abs 060670169(18.6828, electro)
abs 059511630(18.6828, devices) abs 059368055(18.6828, computers)
abs 061031534(18.6828, materials) abs 039564509(18.6828, materials)

EXAMPLE 3

Text processing and matching with respect to U.S. Pat. No. 6,389,398 for "SYSTEM AND METHOD FOR STORING AND EXECUTING NETWORK QUERIES USED IN INTERACTIVE VOICE RESPONSE SYSTEMS"

Abstract: An IVR system for an information network and method for storing and executing user queries stored on the network so that such queries do not have to be re-entered each time a user wants to access information from or execute a transaction on the network. The system can also be programmed to automatically execute the query at a predetermined time or times, and deliver information retrieved from the network and/or confirmation of the execution of a transaction on the network to the user in a format specified by the user.

Claim 1. An interactive voice response system for an information network, comprising:
  a first server for storing and executing at least one query; and,
  a second server coupled to the first server for processing the at least one stored query, wherein when the system executes the at least one stored query, a pause in the at least one stored query of a fixed duration is replaced with a variable-length pause, and an energy level of the stored query is monitored such that the next tone in the at least one stored query is transmitted when the energy level exceeds a predetermined value, thereby stabilizing the system against variations in response times resulting from the system being overloaded.

Descriptive terms:

compute (4.09872); ivr (5); network (5.25726); store (7.12355); query (14.6875); wants (3.75); access (8.62038); transaction (7.16667); program (5.56689); retrieve (13.9432); voice (9.25); server (41.875); couple (2.8809); pause (9.5); monitor (3.31057); tone (2.75401); overloaded (3.33333)

network—store (6.25); automate—program (4.89362); form—network (4.21569); network—server (28.3333); server—store (35); duration—store (7.5); energy—store (3.51064); level—store (7.22222); monitor—store (5); store—transmit (3.30645); energy—exceed (5); level—value (4.13934)

Top 20 primary hits, listing US patent numbers (middle seven digits) and text-library field for each.

abs 061187801(25.5995, electro) abs 059419474(22.3762, computers)
abs 059744308(22.3738, computers) abs 061122068(21.5969, computers)
abs 060232234(21.136, electro) abs 061577057(20.6308, electro)
abs 053512766(19.4468, electro) abs 060946555(19.1938, computers)
abs 054024749(19.1149, electro) abs 061191167(18.8782, computers)
abs 058974938(18.8533, surgery) abs 057901767(18.7906, electro)
abs 056339160(18.7142, electro) abs 061339164(18.5963, computers)
abs 058928251(18.3216, electro) abs 060091037(17.9216, electro)
abs 059604212(17.8871, computers) abs 061015296(17.8871, computers)
abs 060980990(17.8622, computers) abs 057942340(17.7841, computers)

Top 10 secondary hits, listing US patent numbers (middle seven digits) and text-library field for each.

abs 052028925(3.22981, devices) abs 048092231(1.95743, computers)
abs 057900426(1.95743, electro) abs 059865830(1.95743, electro)
abs 050669516(1.95743, electro) abs 060920300(1.95743, computers)
abs 059959142(1.95743, computers) abs 053962532(1.95743, electro)
abs 061674958(1.95743, computers) abs 042086574(1.95743, electro)

Although the invention has been described with respect to particular features and embodiments, it will be appreciated that various modifications and changes may be made without departing from the spirit of the invention.

It is claimed:

1. Machine-readable storage medium embodying computer-executable code which is operable, when used to control an electronic computer, to identify descriptive words or word groups contained in a digitally encoded input text, by the steps of:
   (i) processing the input text to generate a list of text words or word groups formed of proximately arranged words in said input text,
   (ii) selecting a text word or word group from (i) as a descriptive word or word group if that word or word group, respectively, has an above-threshold selectivity value in at least one library of texts in a field, where
   the selectivity value of a word or word group in a library of texts in a field is related to the frequency of occurrence of that word or word group in said library, relative to the frequency of occurrence of the same word or word group, respectively, in at least one other library of texts in at least one other fields, respectively, and
   (iii) storing or displaying the words or word groups selected in (ii) as descriptive words or word groups, respectively.

2. The storage medium of claim 1, wherein said processing includes removing generic words from the input text, to generate a list of non-generic words.

3. The storage medium of claim 2, wherein said processing includes classifying non-generic words into those having a verb root and remaining non-generic words.

4. The storage medium of claim 1 wherein the selectivity value associated with a word in a database containing words from texts in said libraries is related to the greatest selectivity value determined with respect to each of a plurality $N \geq 2$ of libraries of texts in different fields.

5. The sede storage medium 4, wherein the threshold selectivity value is greater than 1.25.

6. An automated method for generating descriptive words or word groups contained in a digitally encoded input text by the operation of machine-readable storage medium embodying computer-executable code when used to control the operation of an electronic computer to carry out the steps of:
   (i) processing the input text to generate a list of text words or word groups formed of proximately arranged words in said input text,
   (ii) selecting a text word or word group from (i) as a descriptive word if that word or word group has an above-threshold selectivity value in at least one library of texts in a field, where
   the selectivity value of a word or word group in a library of texts in a field is related to the frequency of occurrence of that word or word group in said library, relative to the frequency of occurrence of the same word or word group, respectively, in at least one other library of texts in at least one other fields, respectively, and
   (iii) storing or displaying the words or word groups selected in (ii) as descriptive words or word groups, respectively.

7. The method of claim 6, wherein the selectivity value associated with a word in a database containing words from texts in said libraries is related to the greatest selectivity value determined with respect to each of a plurality $N \geq 2$ of libraries of texts in different fields.

* * * * *